(12) United States Patent
Shiiguchi et al.

(10) Patent No.: US 12,091,836 B2
(45) Date of Patent: Sep. 17, 2024

(54) WORKING MACHINE WITH DETAILED OPERATION DEVICE OPERATING WORKING DEVICE

(71) Applicant: KUBOTA CORPORATION, Osaka (JP)

(72) Inventors: Suguru Shiiguchi, Osaka (JP); Kengo Miyazaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/199,015

(22) Filed: May 18, 2023

(65) Prior Publication Data
US 2023/0287652 A1 Sep. 14, 2023

Related U.S. Application Data

(63) Continuation of application No. PCT/JP2021/042718, filed on Nov. 22, 2021.

(30) Foreign Application Priority Data

Nov. 27, 2020 (JP) .................................. 2020-197208
Nov. 27, 2020 (JP) .................................. 2020-197209
(Continued)

(51) Int. Cl.
*E02F 9/20* (2006.01)
*E02F 9/16* (2006.01)

(52) U.S. Cl.
CPC ............ *E02F 9/166* (2013.01); *E02F 9/2004* (2013.01)

(58) Field of Classification Search
CPC ....... E02F 9/166; E02F 9/2004; E02F 9/2275; E02F 9/0875
See application file for complete search history.

(56) References Cited

U.S. PATENT DOCUMENTS 6,450,278 B1   9/2002 Shirogami et al.
2004/0119320 A1*  6/2004 Albright ................. E02F 9/166
                                                        296/190.05
(Continued)

FOREIGN PATENT DOCUMENTS

EP        2253763 A1 * 11/2010 ............. B60K 26/02
JP      S 55088617 U      6/1980
(Continued)

OTHER PUBLICATIONS

Yamashita et al., Truck Loader, Dec. 10, 2009, EPO, JP 2009-28781 A, Machine Translation of Description (Year: 2009).*
(Continued)

*Primary Examiner* — James A English
(74) *Attorney, Agent, or Firm* — Greenblum & Bernstein, P.L.C.

(57) ABSTRACT

A working machine includes: a machine body; an operator's seat; an operation device to pivot on a pivot shaft that extends in a width direction; and a working device to be operated using the operation device. The operation device includes an operation lever and a control valve to be operated using the operation lever and connected to hydraulic hoses. The control valve includes a valve member to be actuated by operating the operation lever, and a block containing fluid passages through which fluid selectively flows upon actuation of the valve member. The fluid passages bend such that first ports in an upper surface of the block facing the valve member and second ports in a peripheral surface extending from a periphery of the upper surface are in communication with each other. The hydraulic hoses are connected to the second ports and extend in a direction away from the peripheral surface.

18 Claims, 25 Drawing Sheets

(30) Foreign Application Priority Data

Nov. 27, 2020 (JP) ................................ 2020-197210
Nov. 27, 2020 (JP) ................................ 2020-197211

(56) References Cited

U.S. PATENT DOCUMENTS

| | | | |
|---|---|---|---|
| 2006/0108309 A1* | 5/2006 | Sato | E02F 3/325 |
| | | | 212/232 |
| 2008/0016976 A1* | 1/2008 | Fukudome | E02F 9/2004 |
| | | | 74/471 XY |
| 2009/0133950 A1* | 5/2009 | Takemura | E02F 9/0866 |
| | | | 180/367 |
| 2013/0067901 A1* | 3/2013 | Masuda | E02F 9/2004 |
| | | | 60/484 |
| 2017/0285681 A1* | 10/2017 | Nishigori | G05G 5/005 |

FOREIGN PATENT DOCUMENTS

| | | | | |
|---|---|---|---|---|
| JP | S 578705 A | 1/1982 | | |
| JP | 3148634 B2 | 3/2001 | | |
| JP | 3443371 B2 | 9/2003 | | |
| JP | 2004-143672 A | 5/2004 | | |
| JP | 2004345587 A * | 12/2004 | ............ | B60R 22/26 |
| JP | 2006-088982 A | 4/2006 | | |
| JP | 2009-287281 A | 12/2009 | | |
| JP | 2011-184970 A | 9/2011 | | |
| JP | 2013-117253 A | 6/2013 | | |
| JP | 2015-232208 A | 12/2015 | | |
| JP | 2017-195849 A | 11/2017 | | |
| JP | 2017-196987 A | 11/2017 | | |
| JP | 2018-090183 A | 6/2018 | | |
| WO | WO-2023164756 A1 * | 9/2023 | | |

OTHER PUBLICATIONS

Fumiyasu Watanabe, Seat Belt Device of Construction Machine, Its Driver's Seat, and Construction Machine, Dec. 9, 2004, JP 2004-345587 A, Machine Translation of Description (Year: 2004).*

Office Action issued Sep. 5, 2023 in Japanese family member application No. 2020-197208 with English language translation thereof.

Office Action issued in Japan Counterpart Patent Appl. No. 2020-197208, dated May 23, 2023, along with an English translation thereof.

Office Action issued in Japan Counterpart Patent Appl. No. 2020-197209, dated May 23, 2023, along with an English translation thereof.

Office Action issued in Japan Counterpart Patent Appl. No. 2020-197210, dated May 23, 2023, along with an English translation thereof.

* cited by examiner

WORKING MACHINE WITH DETAILED OPERATION DEVICE OPERATING WORKING DEVICE

CROSS REFERENCE TO RELATED APPLICATIONS

This application is a continuation application of International Application No. PCT/JP2021/042718, filed on Nov. 22, 2021, which claims the benefit of priority to Japanese Patent Application No. 2020-197210, filed on Nov. 27, 2020, Japanese Patent Application No. 2020-197208, filed on Nov. 27, 2020, Japanese Patent Application No. 2020-197209, filed on Nov. 27, 2020, and to Japanese Patent Application No. 2020-197211, filed on Nov. 27, 2020. The entire contents of each of these applications are hereby incorporated herein by reference.

BACKGROUND OF THE INVENTION

1. Field of the Invention

The present invention relates to a working machine such as a backhoe.

2. Description of the Related Art

A known working machine is disclosed in Japanese Unexamined Patent Application Publication No. 2004-143672.

The working machine disclosed in Japanese Unexamined Patent Application Publication No. 2004-143672 includes an operation device (a console box) that includes control valves and operation levers that operate the control valves beside an operator's seat. Hydraulic hoses are connected to the control valves. The hydraulic hoses extend from the control valves in a downward direction and bend in a backward direction.

A known working machine is disclosed in Japanese Patent No. 3148634.

As for the working machine disclosed in Japanese Patent No. 3148634, a hood that covers, for example, an engine is disposed on a machine body, and a rear portion of the hood is supported by the machine body so as to be openable and closable with a hinge interposed therebetween. The hinge includes a support bracket that is fixed to the machine body, a hinge unit that is fixed to the hood, and a pivot shaft pin that is inserted in the hinge unit and the support bracket and that consequently couples these with each other such that these are pivotable. The pivot shaft pin is supported by using an urging means that urges the hinge unit or the pivot shaft pin in a direction in which the hinge unit or the pivot shaft pin is inserted into the other.

A known working machine is disclosed in Japanese Patent No. 3443371.

The working machine disclosed in Japanese Patent No. 3443371 includes a machine body, an operator's seat that is mounted on the machine body, and an operation device (a control box) that is disposed beside the operator's seat.

A known working machine is disclosed in Japanese Unexamined Patent Application Publication No. 2015-232208.

The working machine disclosed in Japanese Unexamined Patent Application Publication No. 2015-232208 includes a machine body, an oil tank that is mounted on the machine body, and an oil gauge that displays the height of the liquid surface of a hydraulic fluid that is stored in the oil tank. A side cover that covers a side portion of the machine body has a liquid surface inspection window for inspecting the liquid surface of the hydraulic fluid.

SUMMARY OF THE INVENTION

In the case of the technique disclosed in Japanese Unexamined Patent Application Publication No. 2004-143672 described above, however, it is necessary to sharply bend the hydraulic hoses in the backward direction below the control valves. Accordingly, a load is applied to the hydraulic hoses, and the assembly of the hydraulic hoses is not good.

As for the working machine disclosed in Japanese Patent No. 3148634 described above, a strong force is needed not only when the hood is opened but also when the hood is closed. Accordingly, there is a need for a mechanism for assisting a required force when the hood is opened and when the hood is closed. However, the urging means that is included in the working machine described above cannot assist the required force when the hood is opened and when the hood is closed.

As for the working machine disclosed in Japanese Patent No. 3443371 described above, a bracket that supports the operation device differs from a support that supports a seat belt device and is mounted on the machine body. For this reason, the rigidity of the bracket that supports the operation device is low, and the operation device is unsteady when being operated in some cases. There is also a problem in that the number of components increases.

As for the technique disclosed in Japanese Unexamined Patent Application Publication No. 2015-232208 described above, there is a possibility that a hydraulic hose obstructs the inspection of the liquid surface of the hydraulic fluid through the liquid surface inspection window in the case where the hydraulic hose is laid so as to extend near the oil tank.

Preferred embodiments of the present invention provide working machines each of which includes an operation device including at least one control valve and at least one operation lever beside an operator's seat, can reduce a load applied to at least one hydraulic hose connected to the at least one control valve, and can improve the assembly of the at least one hydraulic hose.

Preferred embodiments of the present invention provide working machines each of which can assist a required force when a hood is opened and when the hood is closed.

Preferred embodiments of the present invention provide working machines each of which includes a seat belt device and an operation device beside an operator's seat, can prevent the operation device from being unsteady when the operation device is operated, and can reduce the number of components.

Preferred embodiments of the present invention provide working machines each of which enables at least one hydraulic hose to be appropriately guided in a required direction and that enables a fluid (a fluid surface) stored in an oil tank to be successfully viewed from the outside without obstruction of the at least one hydraulic hose.

A working machine according to a first aspect of the present invention includes: a machine body; an operator's seat mounted on the machine body; an operation device that is disposed beside the operator's seat and that is configured to pivot on a pivot shaft that extends in a width direction of the machine body; and a working device to be operated using the operation device, wherein the operation device includes an operation lever and a control valve to be operated using the operation lever and connected to hydraulic hoses, the control valve includes a valve member to be actuated by operating the operation lever, and a block that contains fluid passages through which a fluid selectively flows upon actuation of the valve member, the fluid passages bend such that first ports in an upper surface of the block facing the valve member and second ports in a peripheral surface that extend from a periphery of the upper surface in a direction intersecting the upper surface are in communication with each other, and the hydraulic hoses are connected to the second ports and extend in a direction away from the peripheral surface.

The working machine according to the first aspect may be configured as described below. The peripheral surface may include a rear surface having the second ports, the rear surface facing rearward with respect to the machine body. The hydraulic hoses may extend from the second ports rearward with respect to the machine body.

The working machine according to the first aspect may be configured such that the block is disposed on an extension line of an axis of the operation lever that passes through a portion in which the operation lever is connected to the valve member and below the valve member.

The working machine according to the first aspect may be configured as described below. The operation lever may be disposed at a front portion of the operation device. The pivot shaft may be disposed at a rear portion of the operation device. The hydraulic hoses may include a curved portion that bends downward. The curved portion may be disposed higher than the pivot shaft.

The working machine according to the first aspect may be configured such that the curved portion is disposed at a position rearward of the block and forward of the pivot shaft.

The working machine according to the first aspect may further include: a prime mover; and a hood to cover the prime mover from above. The working machine may be configured such that the operator's seat and the operation device are disposed above the hood, the hood has, in an upper portion thereof, an opening through which the hydraulic hoses pass, and the opening is located at a position rearward of the block and forward of the pivot shaft.

The working machine according to the first aspect may be configured as described below. The operation device may include a bracket supported by the pivot shaft such that the bracket is pivotable. The bracket may include a front portion to support the block, a rear portion supported by the pivot shaft, and a connection portion to connect the front portion and the rear portion. The hydraulic hoses may extend from the front portion toward the rear portion along the connection portion.

A working machine according to a second aspect of the present invention includes: a prime mover mounted on a machine body; a hood to cover the prime mover from above, to open a space above the prime mover by pivoting on a horizontal shaft in a first direction, and to close the space above the prime mover by pivoting on the horizontal shaft in a second direction; and an assist mechanism to apply a spring force to assist the hood in pivoting on the horizontal shaft, wherein the assist mechanism is operable to apply the spring force to assist the hood in pivoting in the first direction when the hood is opened and apply the spring force to assist the hood in pivoting in the second direction when the hood is closed.

The working machine according to the second aspect may be configured as described below. The horizontal shaft may include a first horizontal shaft located at one of opposite sides of the machine body in a width direction of the machine body and a second horizontal shaft located at the other of opposite sides of the machine body in the width direction of the machine body. The assist mechanism may include a first spring including a helical torsion spring that is wound around the first horizontal shaft and that applies the spring force and a second spring including another helical torsion spring that is wound around the second horizontal shaft and that applies the spring force.

The working machine according to the second aspect may be configured such that the assist mechanism assists the hood in pivoting in the first direction when a center of gravity of a pivot portion that pivots together with the hood is located forward of a rear end of the machine body and assists the hood in pivoting in the second direction when the center of gravity of the pivot portion is located rearward of the rear end of the machine body.

The working machine according to the second aspect may be configured such that the assist mechanism assists the hood in pivoting in the first direction when a pivot angle that is an angle of pivot of the hood which pivots on the horizontal shaft from a closing position to an opening position is within a range from the closing position to a first angle, and assists the hood in pivoting in the second direction when the pivot angle is in a range from a second angle to the opening position, the second angle being equal to or greater than the first angle.

The working machine according to the second aspect may be configured such that the assist mechanism does not assist the hood in pivoting when the pivot angle is between the first angle and the second angle.

The working machine according to the second aspect may be configured as described below. The assist mechanism may include a first member fixed to the machine body, a second member fixed to the hood and pivotable on the horizontal shaft relative to the first member, and a linkage member having one of opposite ends mounted on the first member via a first shaft and the other of the opposite ends mounted on the second member via a second shaft. The first member may include a first lock to lock one of opposite end portions of the helical torsion spring and has a guide hole to guide movement of the first shaft with pivot movement of the hood. The second member may include a second lock to lock the other of the opposite end portions of the helical torsion spring.

The working machine according to the second aspect may be configured as described below. The second lock may have a long hole in the form of an arc centered on the horizontal shaft. The other of the opposite end portions of the helical torsion spring may be in contact with one of opposite ends of the long hole when the hood is closed and in contact with the other of the opposite ends of the long hole when the hood is open.

The working machine according to the second aspect may further include: a locking mechanism to hold the hood in a closed state with respect to the machine body. The working machine may be configured as described below. The locking mechanism may include a receiving member on the machine body, a locking member on the hood to be locked on the receiving member, and an operation mechanism to move the locking member between a locking position in which the locking member is locked on the receiving member and an unlocking position in which the locking member is unlocked from the receiving member The receiving member may include a first portion located at one of opposite sides of the machine body in a width direction, a second portion disposed at the other of the opposite sides of the machine body in the width direction, and a coupler on which the locking member is locked, the coupler coupling one of opposite ends of the first portion and one of opposite ends of the second portion with each other. The other of the opposite ends of the first portion and the other of the opposite ends of the second portion may be fixed to the machine body.

A working machine according to a third aspect of the present invention includes: a machine body; an operator's seat on the machine body; an operation device provided on the machine bod on one side of the operator's seat, a working device to be operated using the operation device; a seat belt device including a seat belt to be worn by an operator who sits on the operator's seat, a container to contain the seat belt, and an engagement portion with which a distal portion of the seat belt pulled from the container is engaged; an operation bracket to support the operation device on the machine body; and a seat belt support to support the seat belt device on the machine body, wherein the operation bracket and the seat belt support are integral with each other.

The working machine according to the third aspect may further include: a seat bracket to support the operator's seat on the machine body. The working machine is preferably configured such that the seat bracket, the operation bracket, and the seat belt support are integral with each other.

The working machine according to the third aspect may be configured as described below. The operation device may include a first operation device provided on one side of the operator's seat and a second operation device provided on the opposite side of the operator's seat. The operation bracket may include a first operation bracket to support the first operation device and a second operation bracket to support the second operation device. The seat bracket may include a lower plate placed on the hood, and a slide rail fixed to an upper surface of the lower plate to allow the operator's seat to slide in forward and backward directions. The seat belt support may include a first side plate that extends upward from a one of opposite side edges of the lower plate and that is connected to the first operation bracket, and a second side plate that extends upward from the other of the opposite side edges of the lower plate and that is connected to the second operation bracket.

The working machine according to the third aspect may be configured such that the seat belt support includes a first support on which the container is mounted, the first support including the first side plate, and a second support on which the engagement portion is mounted, the second support including the second side plate.

The working machine according to the third aspect preferably includes a reinforcement material that is fixed to the upper surface of the lower plate and that connects the first side plate and the second side plate to each other.

The working machine according to the third aspect may be configured as described below. The first operation bracket may include a first vertical plate that faces the first side plate, a first horizontal plate that connects a lower portion of the first vertical plate and the first side plate to each other, and a first connection plate that connects the first side plate, the first vertical plate, and the first horizontal plate to each other. The second operation bracket may include a second vertical plate that faces the second side plate, a second horizontal plate that connects a lower portion of the second vertical plate and the second side plate to each other, and a second connection plate that connects the second side plate, the second vertical plate, and the second horizontal plate to each other.

The working machine according to the third aspect may include a first reinforcement plate that connects the first side plate and the lower plate to each other, and a second reinforcement plate that connects the second side plate and the lower plate to each other. The first reinforcement plate may overlap the slide rail and the first connection plate in the forward and backward directions. The second reinforcement plate may overlap the slide rail and the second connection plate in the forward and backward directions.

A working machine according to a fourth aspect of the present invention includes: a machine body: an oil tank mounted on the machine body; a working device to be driven by a hydraulic fluid stored in the oil tank; and a hydraulic hose through which the hydraulic fluid flows, wherein the oil tank includes a viewing window through which the hydraulic fluid in the oil tank is visible, and a tubular portion having the viewing window attached thereto and having an outer surface that protrudes from a wall surface of the oil tank and that guides the hydraulic hose.

The working machine according to the fourth aspect may be configured such that a length of a protrusion of the tubular portion from the oil tank is preferably set to a length equal to or more than an outer diameter of the hydraulic hose.

The working machine according to the fourth aspect may include an operator's seat that is mounted on the machine body, and an operation device that operates the working device. The operation device may include a first operation device that is adjacent to a side of the operator's seat and a second operation device that is adjacent to another side of the operator's seat. The hydraulic hose may include a first hydraulic hose that is connected to the first operation device, and a second hydraulic hose that is connected to the second operation device. The first hydraulic hose and the second hydraulic hose may be guided along the outer surface of the tubular portion opposite each other with the viewing window interposed therebetween.

The working machine according to the fourth aspect may be configured such that the tubular portion has a cylindrical shape.

The working machine according to the fourth aspect may be configured as described below. The tubular portion may have a cylindrical shape having an axial center that extends in a substantially horizontal direction. The hydraulic hose may extend in upward and downward directions along the outer surface of the tubular portion.

The working machine according to the fourth aspect may be configured such that a first guide member that guides the hydraulic hose toward the tubular portion is preferably mounted on the oil tank.

The working machine according to the fourth aspect may be configured such that the first guide member is preferably composed of a round rod that is mounted along a corner edge of the oil tank.

The working machine according to the fourth aspect may be configured as described below. The machine body may include a turn plate that can turn about an axis that extends in the upward and downward directions. A second guide member that guides the hydraulic hose that extends along the tubular portion may be mounted on the turn plate.

The working machine according to the fourth aspect preferably may include a valve unit that controls supply of the hydraulic fluid to the working device, and an operation device that operates the working device. The operation device may include a pilot valve that controls supply of pilot oil for actuating the valve unit. The hydraulic hose may be a pilot hose that connects the operation device and the valve unit to each other and that causes the pilot oil to flow.

The working machine according to the fourth aspect may be configured such that the viewing window preferably enables the hydraulic fluid in the oil tank to be visible through an inner space of the tubular portion.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
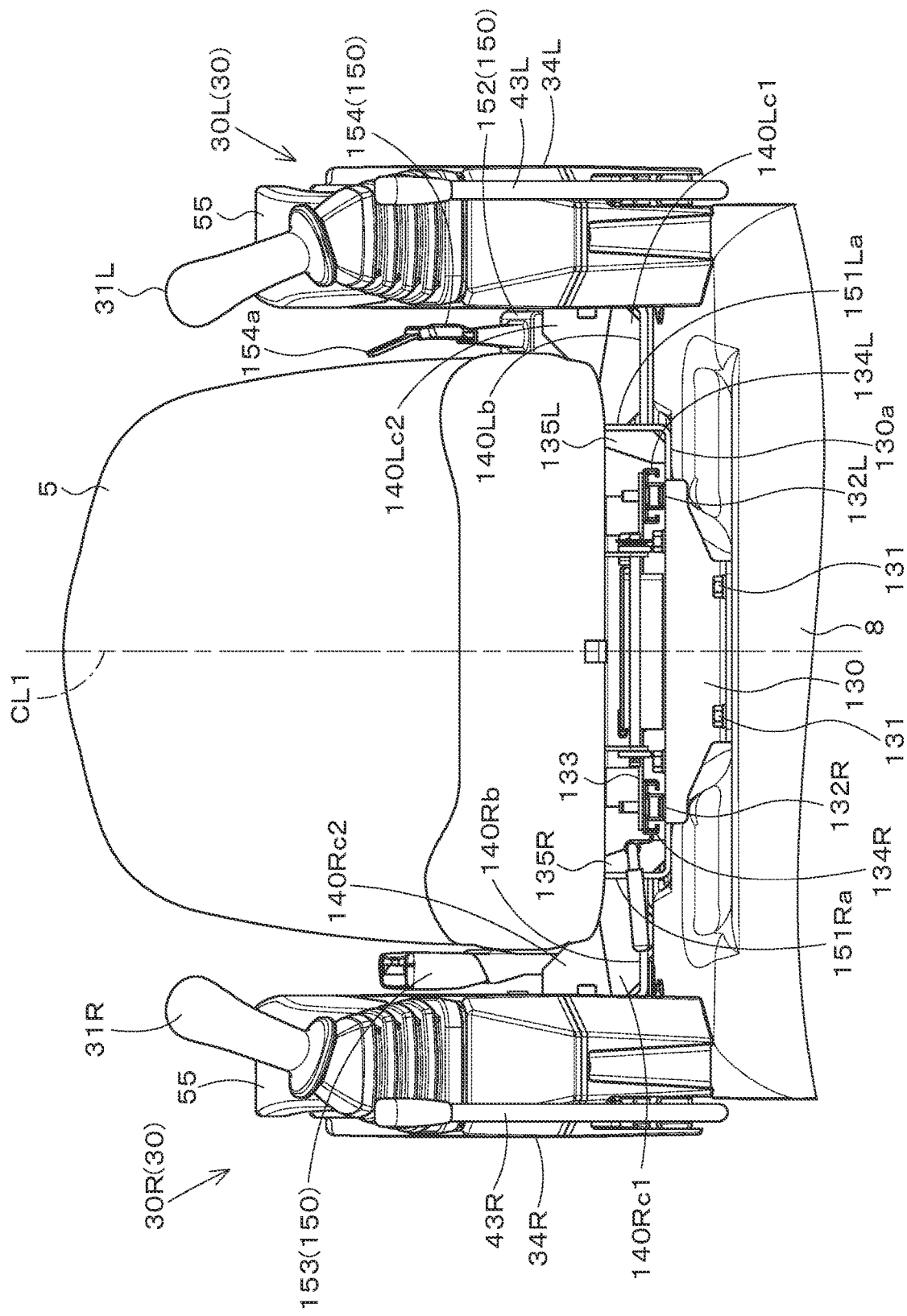
FIG. 1 is a front view of, for example, an operator's seat and an operation device.

The preferred embodiments will now be described with reference to the accompanying drawings, wherein like reference numerals designate corresponding or identical elements throughout the various drawings. The drawings are to be viewed in an orientation in which the reference numerals are viewed correctly.

A working machine according to an embodiment of the present invention will hereinafter be described with reference to the drawings.

Figure 25:
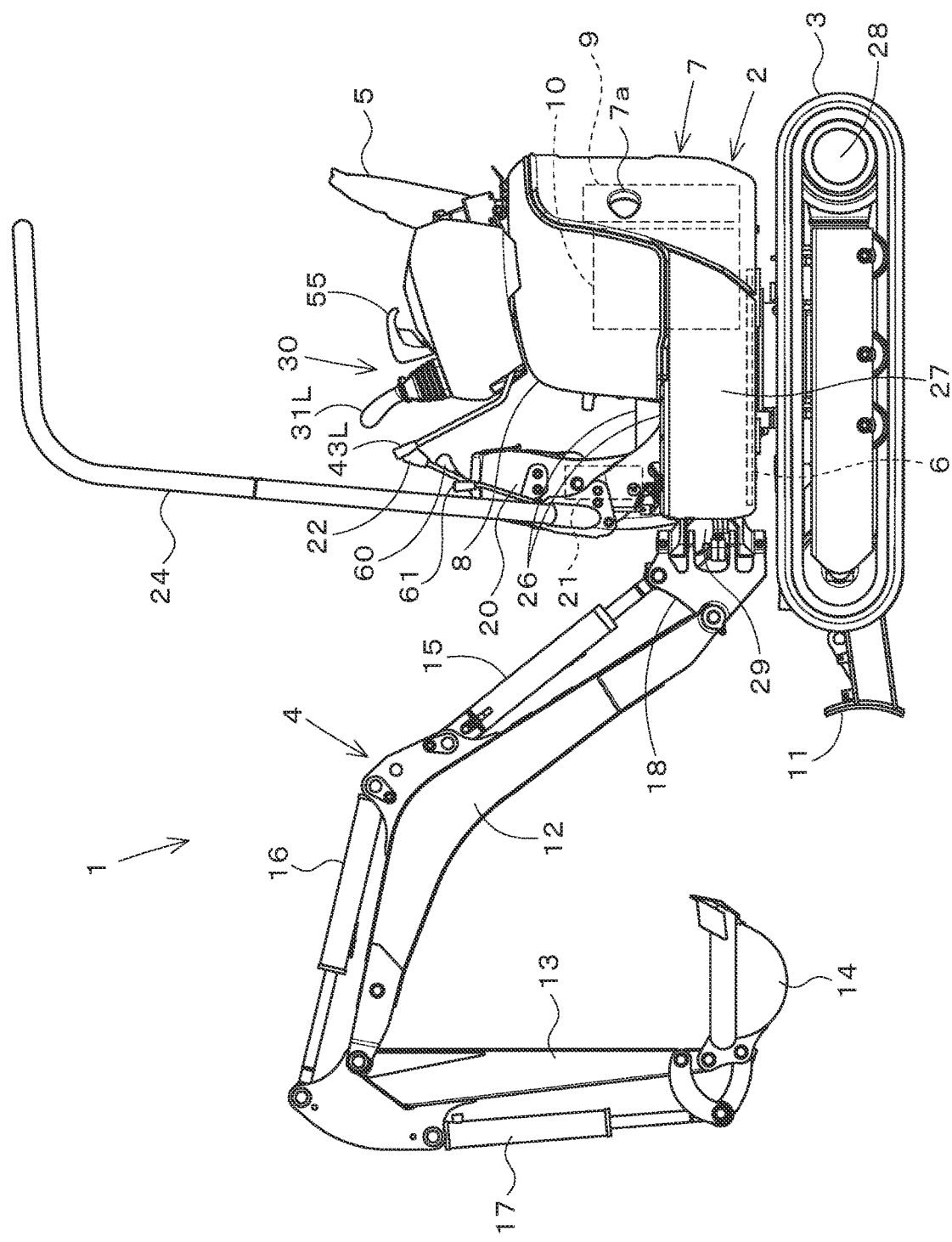
FIG. 25 is a side view illustrating the working machine according to an embodiment.

FIG. 25 is a side view illustrating a working machine 1 according to an embodiment of the present invention. The working machine 1 according to the present embodiment is a backhoe, which is a turn working machine.

The working machine 1 includes a machine body 2, a traveling device 3, and a working device 4. An operator's seat 5 is disposed on the machine body 2. In the following description, the front direction (the direction of the left of the page in FIG. 25) of an operator who sits on the operator's seat 5 referred to as a "forward direction", the rear direction (the direction of the right of the page in FIG. 25) of the operator is referred to as a "backward direction", the left-hand direction (the direction of the front of the page in FIG. 25) of the operator is referred to as a "leftward direction", and the right-hand direction (the direction of the back of the page in FIG. 25) of the operator is referred to as a "rightward direction". In the description, a horizontal direction corresponding to a direction perpendicular to the forward and backward directions is referred to as the "width direction of the machine body". In the description, a direction from a central portion of the machine body 2 toward a right-hand portion or a left-hand portion is referred to as an "outward direction with respect to the machine body". In other words, the "outward direction with respect to the machine body" corresponds to the width direction of the machine body and the direction away from the machine body 2. In the description, a direction opposite the outward direction with respect to the machine body is referred to as an "inward direction with respect to the machine body". In other words, the inward direction with respect to the machine body corresponds to the width direction of the machine body and the direction toward the machine body 2.

The machine body 2 is supported on the frame of the traveling device 3 with a bearing interposed therebetween so as to be capable of turning about a vertical shaft (a shaft that extends in upward and downward directions). The machine body 2 includes a turn plate 6 and a weight 7. The turn plate 6 turns by being driven by a turn motor (not illustrated) composed of a hydraulic motor. A step plate 26 on which the operator who sits on the operator's seat 5 puts the feet is disposed above the turn plate 6. A side cover 27 covers a space between the turn plate 6 and the step plate 26.

The working device 4 is mounted on a front portion of the machine body 2. The weight 7 is mounted on a rear portion of the machine body 2 to balance its weight and that of the working device 4. A hood 8 is disposed at an upper portion of the machine body 2.

The operator's seat 5 is disposed above the hood 8. A prime mover 10, a hydraulic pump (not illustrated), a hydraulic fluid tank (an oil tank) 9, for example, are disposed in the hood 8. The hydraulic fluid tank 9 stores a hydraulic fluid for driving the working device 4. According to the present embodiment, the prime mover 10 is a diesel engine but is not limited thereto. For example, the prime mover 10 may be another internal combustion engine such as a gasoline engine or may be an electric motor.

The traveling device 3 is a crawler traveling device and is disposed on the right and left of the machine body 2 below the machine body 2. The traveling device 3 is driven by a traveling motor 28 composed of a hydraulic motor. A dozer 11 is disposed at a front portion of the traveling device 3. The dozer 11 is driven by a dozer cylinder (not illustrated).

The working device 4 includes a boom 12, an arm 13, and a working tool (a bucket) 14. The working device 4 also includes a boom cylinder 15, an arm cylinder 16, and a working tool cylinder 17 that serve as drive mechanisms for these such as the boom. The boom cylinder 15, the arm cylinder 16, the working tool cylinder 17, and the dozer cylinder are composed of hydraulic cylinders. The hydraulic cylinders (hydraulic actuators) are driven by using the hydraulic fluid that is supplied from the hydraulic fluid tank 9 via the hydraulic pump. The working device 4 is operated by an operation device 30 described later.

A base end portion of the boom 12 is supported by a swing bracket 18 that is disposed at the front portion of the machine body 2 so as to be swingable about a horizontal shaft. The swing bracket 18 is supported so as to be swingable about a vertical shaft with respect to a support bracket 29 that is included in the machine body 2. A swing cylinder (not illustrated) composed of a hydraulic cylinder is mounted on the machine body 2. The swing bracket 18 swings by being driven by the swing cylinder. A base end portion of the arm 13 is supported on a distal portion of the boom 12 so as to be swingable about a horizontal shaft. The working tool 14 is mounted on a distal portion of the arm 13.

The boom cylinder 15 couples the swing bracket 18 and an intermediate portion of the boom 12. The boom 12 swings in the upward and downward directions due to expansion and contraction of the boom cylinder 15. The arm cylinder 16 couples the intermediate portion of the boom 12 and the base end portion of the arm 13. The arm 13 swings in the upward and downward directions due to expansion and contraction of the arm cylinder 16. The working tool cylinder 17 couples the base end portion of the arm 13 and a mounting portion of the working tool 14. The working tool 14 performs shovel-dump operations due to expansion and contraction of the working tool cylinder 17.

A ROPS 24 for protecting the operator who sits on the operator's seat 5 is disposed on the machine body 2. An operation console 20 is disposed at a front portion on the step plate 26 away from the operator's seat 5 and the hood 8 in the forward direction. The operation console 20 includes a traveling lever 22. The traveling lever 22 is a lever for operating the traveling device 3. The operation console 20 also includes a dozer lever 60 for driving the dozer cylinder and an accelerator lever 61 for controlling rotation of the prime mover 10.

A valve unit 21 is disposed in the operation console 20. The valve unit 21 is acquired in a manner in which multiple control valves that control the hydraulic actuator of the working device 4 are arranged in the width direction of the machine body and are integrally formed. Examples of the control valves that are included in the valve unit 21 include a turn valve for the turn motor, an arm valve for the arm cylinder 16, a boom valve for the boom cylinder 15, a working tool valve for the working tool cylinder 17, right-hand and left-hand traveling valves for the traveling motor 28, a variable speed valve for changing the speed of the traveling motor 28, a dozer valve for the dozer cylinder, and a swing valve for the swing cylinder.

Among the control valves, the traveling valves, the dozer valve, the variable speed valve, and the swing valve are mechanical control valves in which an operating force is transmitted via, for example, a link. The traveling lever 22 and the dozer lever 60 are mechanically connected to the control valves, for example, with a link mechanism interposed therebetween. Specifically, the traveling lever 22 is connected to the traveling valves. The dozer lever 60 is connected to the dozer valve. The swing valve is mechanically connected to a swing pedal that is disposed on the right of the operation console 20. The variable speed valve is mechanically connected to a shift pedal that is disposed on the left of the operation console 20.

The turn valve, the arm valve, the boom valve, and the working tool valve are hydraulic valves that are operated by using the pressure of pilot oil that is supplied from the hydraulic pump (a pilot pump). The turn valve, the arm valve, the boom valve, and the working tool valve are connected to at least one pilot valve (at least one remote-control valve) with at least one hydraulic hose (at least one pilot hose) interposed therebetween. According to the present embodiment, the at least one pilot valve includes a first pilot valve 32L and a second pilot valve 32R described later.

Operation Device

Figure 2:
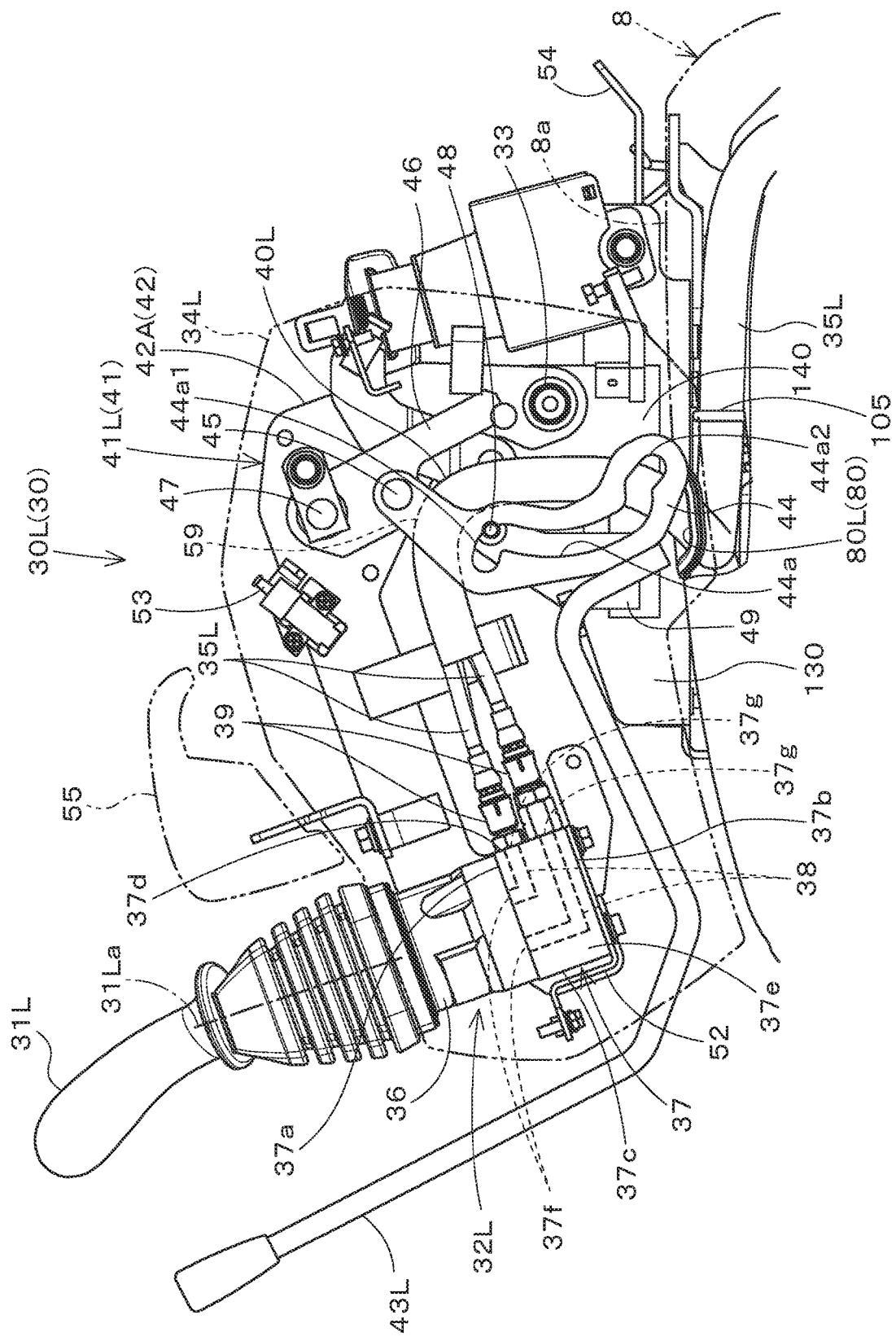
FIG. 2 is a side view illustrating an inner structure of the operation device.
Figure 24:
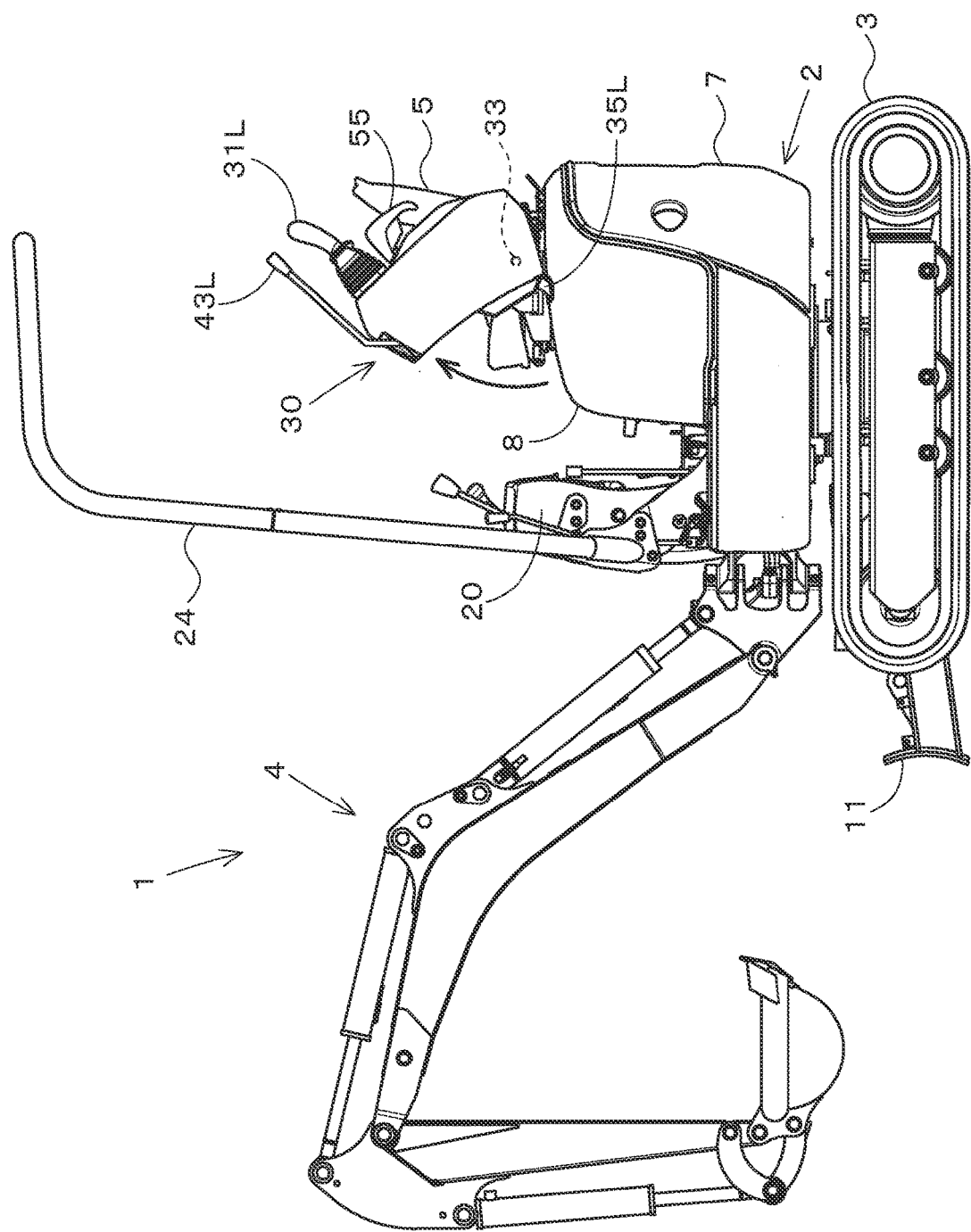
FIG. 24 illustrates the operation device of a working machine that is lifted up.

As illustrated in, for example, FIG. 1, FIG. 2, and FIG. 25, the operation device 30 is disposed beside the operator's seat 5 and above the hood 8. As illustrated in FIG. 24, the operation device 30 pivots on a pivot shaft 33 that extends in the width direction of the machine body such that a front portion thereof can be lifted up. The pivot shaft 33 is disposed at a rear portion of the operation device 30. The position of the operation device 30 can be changed between a first position (see FIG. 25) in which the front portion is not lifted up and a second position (see FIG. 24) in which the front portion is lifted up. Positional relationships among components described below are based on when the operation device 30 is in the first position unless otherwise particularly described.

As illustrated in FIG. 1, the operation device 30 includes a first operation device 30L and a second operation device 30R. The first operation device 30L is adjacent to a side of the operator's seat 5 (away therefrom in the leftward direction). The second operation device 30R is adjacent to another side of the operator's seat 5 (away therefrom in the rightward direction). The first operation device 30L is a device for a turning operation and an arm operation. The second operation device 30R is a device for a boom operation and a bucket operation.

The structure of the first operation device 30L and the structure of the second operation device 30R are mostly common to each other. Accordingly, the structure of the first operation device 30L will be first described, and differences between the second operation device 30R and the first operation device 30L will be subsequently described.

As illustrated in FIG. 1 and FIG. 2, the first operation device 30L includes an operation lever (a first operation lever) 31L, the control valve (the first pilot valve) 32L, a casing (a first casing) 34L.

The first operation lever 31L is disposed at a front portion of the first operation device 30L. The first operation lever 31L is mounted on an upper portion of the first casing 34L and is swingable in the forward, backward, leftward, and rightward directions. The first pilot valve 32L is contained in the first casing 34L. A wrist rest 55 is mounted on the upper portion of the first casing 34L.

The first pilot valve 32L is operated by using the first operation lever 31L. The first pilot valve 32L controls supply of the pilot oil for actuating the control valves that are included in the valve unit 21. Multiple hydraulic hoses (first pilot hoses) 35L are connected to the first pilot valve 32L. According to the present embodiment, the number of the first pilot hoses 35L is six. The first pilot hoses 35L connect the first operation device 30L and the valve unit 21 to each other and cause the pilot oil for actuating the control valves that are included in the valve unit 21 to flow.

As illustrated in FIG. 2, the first pilot valve 32L includes a valve member 36 and a block 37. The valve member 36 is actuated by swinging the first operation lever 31L. Specifically, the valve member 36 contains a spool (not illustrated) that moves by swinging the first operation lever 31L. The block 37 contains multiple fluid passages 38 through which the fluid selectively flows due to actuation of the valve member 36 (movement of the spool).

The block 37 has an upper surface 37a facing the valve member 36 and a peripheral surface that extends from the periphery of the upper surface 37a in a direction in which the peripheral surface intersects with the upper surface 37a. According to the present embodiment, the shape of the block 37 is a rectangular cuboid shape. For this reason, the peripheral surface of the block 37 includes a lower surface 37b facing in a downward direction (in the downward direction with respect to the machine body), a front surface 37c facing in the forward direction (in the forward direction with respect to the machine body), a rear surface 37d facing in the backward direction (in the backward direction with respect to the machine body), a left-hand surface 37e facing in the leftward direction (in the leftward direction with respect to the machine body), and a right-hand surface facing in the rightward direction (in the rightward direction with respect to the machine body).

In the first casing 34L, the block 37 is disposed on an extension line from a swing center axis 31La of the operation lever 31L and an operation lever 31R (the direction of the axial center of each of shafts that are included in the operation levers 31L and 31R at a portion in contact with the valve member 36) and below the valve member 36. The multiple fluid passages 38 bend into an L-shape such that at least one first port 37f that is formed in the upper surface 37a of the block 37 and at least one second port 37g that is formed in the peripheral surface of the block 37 are in communication with each other. According to the present embodiment, the at least one second port 37g is formed in the rear surface 37d of the block 37. The number of the at least one first port 37f and the number of the at least one second port 37g match the number of the first pilot hoses 35L. According to the present embodiment, the number of the at least one first port 37f is six, and the number of the at least one second port 37g is six. The number of the fluid passages 38 is six. The spool of the valve member 36 moves by swinging the first operation lever 31L, and the port and the fluid passage 38 through which the fluid flows are consequently selected (switched).

Figure 3:
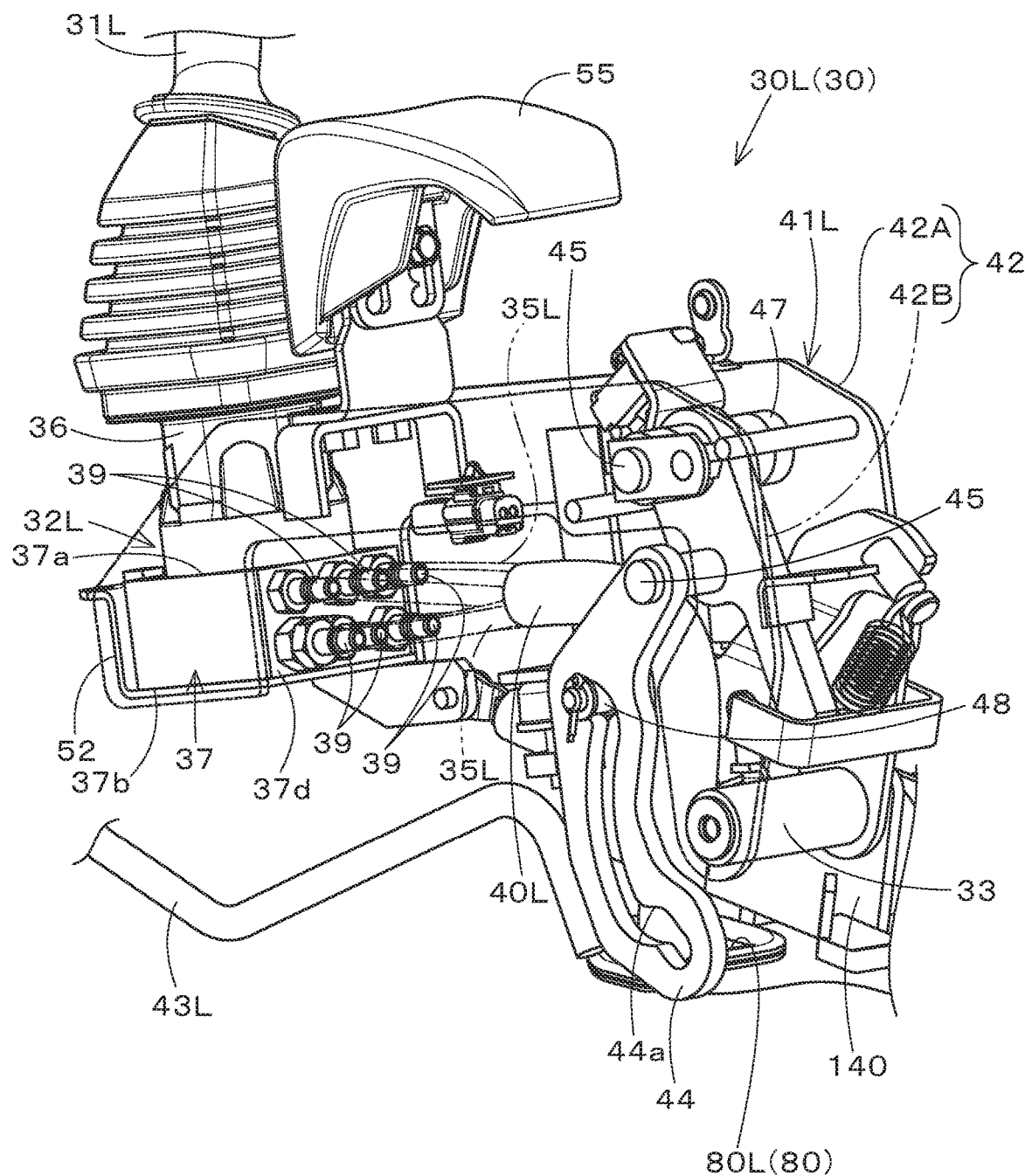
FIG. 3 is a rear perspective view illustrating the inner structure of the operation device.

The at least one first port 37f of the block 37 is connected to the valve member 36. First end portions of the first pilot hoses 35L are connected to the at least one second port 37g of the block 37 with at least one pipe connector 39 interposed therebetween. As illustrated in FIG. 3, the at least one pipe connector 39 is a straight pipe connector and linearly extends from the at least one second port 37g in the backward direction. The multiple (six) first pilot hoses 35L are connected to respective multiple (six) second ports 37g with the at least one pipe connector 39 interposed therebetween. The multiple (six) first pilot hoses 35L that are connected to the respective second ports 37g extend from the respective second ports 37g in a direction (the backward direction) away from the peripheral surface (the rear surface 37d) of the block 37. That is, all of the multiple first pilot hoses 35L of the first operation device 30L are connected to the second ports 37g of the block 37 and extend in the direction (the backward direction) away from the peripheral surface (the rear surface 37d).

The multiple (six) first pilot hoses 35L are bundled into a first hose bundle 40L in the first casing 34L. The first hose bundle 40L may be acquired in a manner in which the multiple first pilot hoses 35L are bundled by using, for example, a cable tie or may be acquired in a manner in which the multiple first pilot hoses 35L are inserted into a single thick pipe.

Second end portions of the first pilot hoses 35L are connected to the control valves that are included in the valve unit 21. Among the six first pilot hoses 35L, two first pilot hoses are connected to the boom valve, and two first pilot hoses are connected to the working tool valve. One of the remaining two is connected to the pilot pump, and the other is connected to a drain with the valve unit 21 interposed therebetween (or directly).

Figure 4:
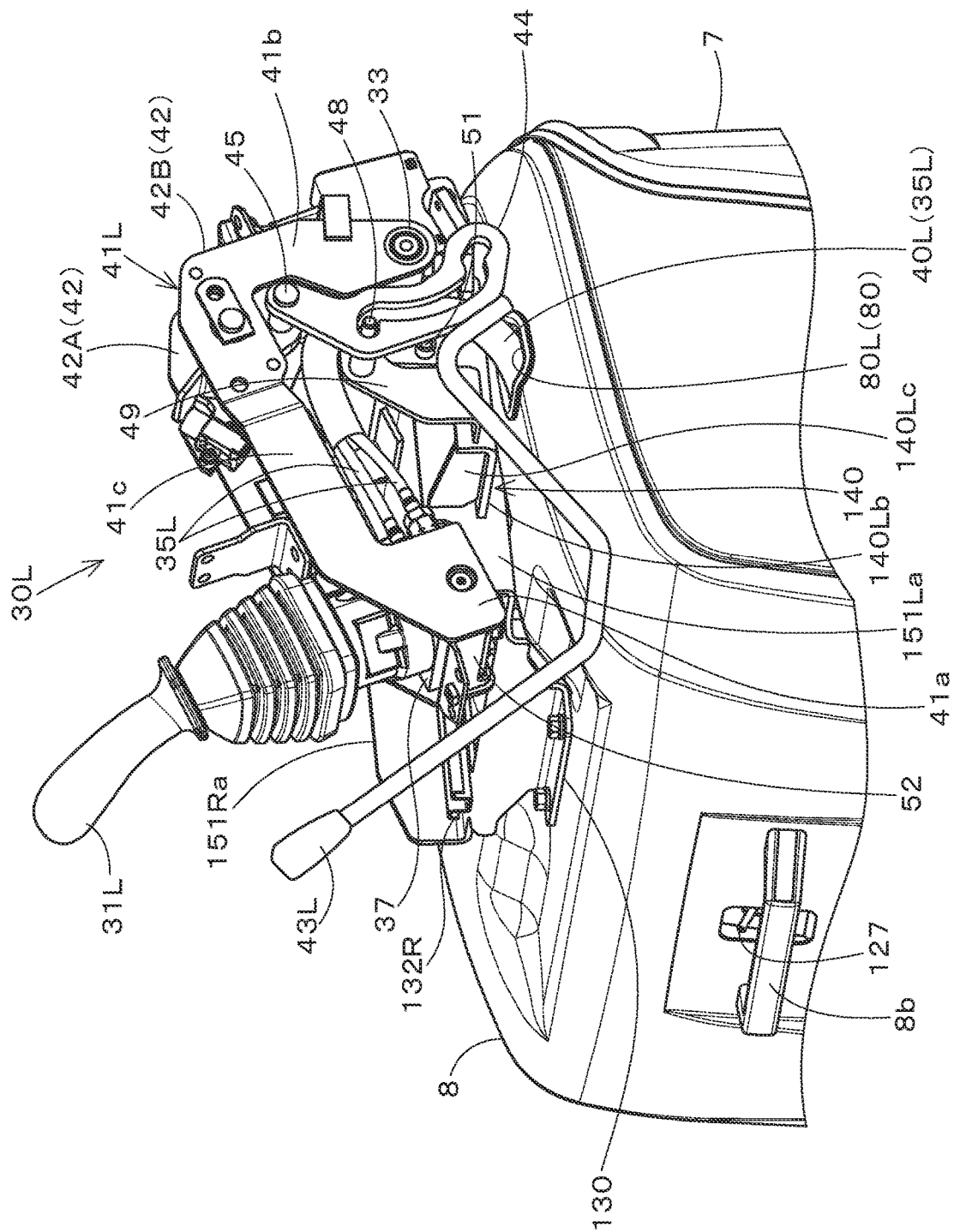
FIG. 4 is a front perspective view illustrating, for example, a hood and a first operation device.

As illustrated in FIG. 2, FIG. 3, and FIG. 4, the first operation device 30L includes a bracket (a first bracket) 41L that supports the first operation lever 31L and the first pilot valve 32L. The first bracket 41L is contained in the first casing 34L. A rear portion of the first bracket 41L is supported by the pivot shaft 33 so as to be pivotable. The pivot shaft 33 is supported on the machine body 2 (specifically, on the hood 8) by using an operation bracket 140.

As illustrated in FIG. 4, the first bracket 41L includes a front portion 41a, a rear portion 41b, and a connection portion 41c. The front portion 41a corresponds to a front portion of the first bracket 41L and supports the block 37. The rear portion 41b corresponds to a rear portion of the first bracket 41L and is supported by the pivot shaft 33. The connection portion 41c connects the front portion 41a and the rear portion 41b to each other.

As illustrated in FIG. 3 and FIG. 4, the first bracket 41L includes two side plates 42 that are disposed at an interval in the width direction of the machine body. Front portions of the two side plates 42 are included in the front portion 41a. Rear portions of the two side plates 42 are included in the rear portion 41b. Intermediate portions of the two side plates 42 in the forward and backward directions are included in the connection portion 41c. The two side plates 42 include an inner side plate 42A that is shifted in the inward direction with respect to the machine body (that is adjacent to the operator's seat 5) and an outer side plate 42B that is shifted in the outward direction with respect to the machine body (that is opposite the operator's seat 5). The block 37 is fixed between the inner side plate 42A and the outer side plate 42B and is supported by the first bracket 41L. The pivot shaft 33 extends across the inner side plate 42A and the outer side plate 42B.

As illustrated in, for example, FIG. 2, FIG. 3, FIG. 4, and FIG. 5, the first operation device 30L includes a lock lever (a first lock lever) 43L. The first lock lever 43L is held by the operator when the position of the first operation device 30L is changed between the first position (see FIG. 25) and the second position (see FIG. 24). The first lock lever 43L is pulled up, and the position of the first operation device 30L can be consequently changed from the first position into the second position. The first lock lever 43L is pushed down, and the position of the first operation device 30L can be consequently changed from the second position into the first position.

A base end portion of the first lock lever 43L is connected to a cam plate 44 that has a cam groove 44a. An upper end portion of the cam plate 44 is supported by a swing plate 46 with a first pivot shaft 45 interposed therebetween. The swing plate 46 is supported by the first bracket 41L with a second pivot shaft 47 interposed therebetween. A pin 48 is inserted in the cam groove 44a.

The pin 48 extends from a fixing plate 49 (see FIG. 4 and FIG. 6) that is fixed to the operation bracket 140 in the outward direction with respect to the machine body. An upper portion of the fixing plate 49 is coupled with the operation bracket 140 by using a coupling shaft 50, and a lower portion thereof is connected to the operation bracket 140, for example, by welding. The operation bracket 140 includes a mounting shaft 51 on which a first end portion of an urging member (not illustrated) such as a gas cylinder is mounted. A second end portion of the urging member is connected to a lower portion of a front bracket 52 that is mounted on the front portion of the first bracket 41L. The urging member has an urging force for assisting a required force when the operation device 30 pivots from the first position to the second position.

The pin 48 moves in the cam groove 44a along with raising or lowing the first lock lever 43L. As illustrated in FIG. 2, when the first lock lever 43L is in a lowering position (when the first operation device 30L is in the first position), the pin 48 is located at an upper portion 44a1 of the cam groove 44a. When the first lock lever 43L is in a raising position (when the first operation device 30L is in the second position), the pin 48 is located at a lower portion 44a2 of the cam groove 44a. According to the present embodiment, even when a portion (such as the operation lever 31L or the wrist rest 55) of the first operation device 30L other than the first lock lever 43L is operated with the first operation device 30L being in the second position, the pin 48 cannot be separated from the lower portion 44a2 of the cam groove 44a, and the first operation device 30L is held in the second position. That is, the first operation device 30L cannot be moved from the second position to the first position unless the first lock lever 43L is operated.

As illustrated in, for example, FIG. 2, the first operation device 30L includes a switch 53 such as a limit switch. The switch 53 is mounted on the first bracket 41L. The switch 53 pivots about the pivot shaft 33 together with the first bracket 41L along with pulling up the first lock lever 43L. When the first operation device 30L is in the second position, the switch 53 is in contact with a detection plate 54 that is fixed to the machine body 2 (the hood 8). Consequently, it is detected that the first operation device 30L is in the second position.

It is detected that the first operation device 30L is in the second position, the state of an unloading valve (not illustrated) is then changed into an ON state, and the supply of the hydraulic fluid to the working device 4 ends. When the first operation device 30L is in the first position, the state of the unloading valve is an OFF state, and accordingly, the hydraulic fluid is permitted to be supplied to the working device 4. Consequently, when the first lock lever 43L is in the lowering position (when the first operation device 30L is in the first position), the working device 4 can be driven, and when the first lock lever 43L is in the raising position (when the first operation device 30L is in the second position), the working device 4 cannot be driven.

As illustrated in FIG. 4, the first pilot hoses 35L extend from the front portion 41a toward the rear portion 41b along a lower portion of the connection portion 41c of the first bracket 41L. The first pilot hoses 35L include curved portions 59 (see FIG. 2) that curve downward. The curved portions 59 are disposed above the pivot shaft 33. Specifically, the curved portions 59 are disposed above the pivot shaft 33 away therefrom in the forward direction. The curved portions 59 extend between the pivot shaft 33 and the pin 48. The curved portions 59 extend between the pin 48 and the first pivot shaft 45. The first pilot hoses 35L curve downward at the curved portions 59, extend through an opening 80 that is formed in the hood 8, and are inserted in the hood 8.

The opening 80 of the hood 8 is formed at a position away from the block 37 in the backward direction and away from the pivot shaft 33 in the forward direction. Consequently, the first pilot hoses 35L are inserted in the hood 8 via the opening 80 away from the pivot shaft 33 in the forward direction. Specifically, the first pilot hoses 35L are inserted in the hood 8 via the opening 80 between the block 37 and the pivot shaft 33 in the forward and backward directions.

The second operation device 30R will now be described. As for the second operation device 30R, differences from the first operation device 30L will be mainly described, and a description for a common structure is omitted.

The differences are that the first operation device 30L and the second operation device 30R are bilaterally symmetric, and operation targets thereof differ from each other. The other structures are common to each other.

The former difference will be described. The first operation device 30L and the second operation device 30R are bilaterally symmetric with a center line CL1 (see FIG. 1) in the width direction of the machine body interposed therebetween. The latter difference will be described. The second operation device 30R is a device for the boom operation and the bucket operation as described above. For this reason, two second pilot hoses of the six second pilot hoses 35R of the second operation device 30R are connected to the turn valve, and two second pilot hoses are connected to the arm valve.

The structure of the second operation device 30R is common to the structure of the first operation device 30L except for the differences. That is, the second operation device 30R includes components corresponding to the structure of the first operation device 30L described above. Specifically, the structure of the second operation device 30R is acquired by changing the "first" into the "second" and changing "L" into "R" regarding the structure of the first operation device 30L described above. For example, the second operation device 30R includes the second operation lever 31R, a second casing 34R, a second bracket 41R, and the second pilot valve 32R as components corresponding to the first operation lever 31L, the first casing 34L, the first bracket 41L, the first pilot valve 32L of the first operation device 30L. These components of the second operation device 30R and the corresponding components of the first operation device 30L are the same except for the differences described above.

Figure 7:
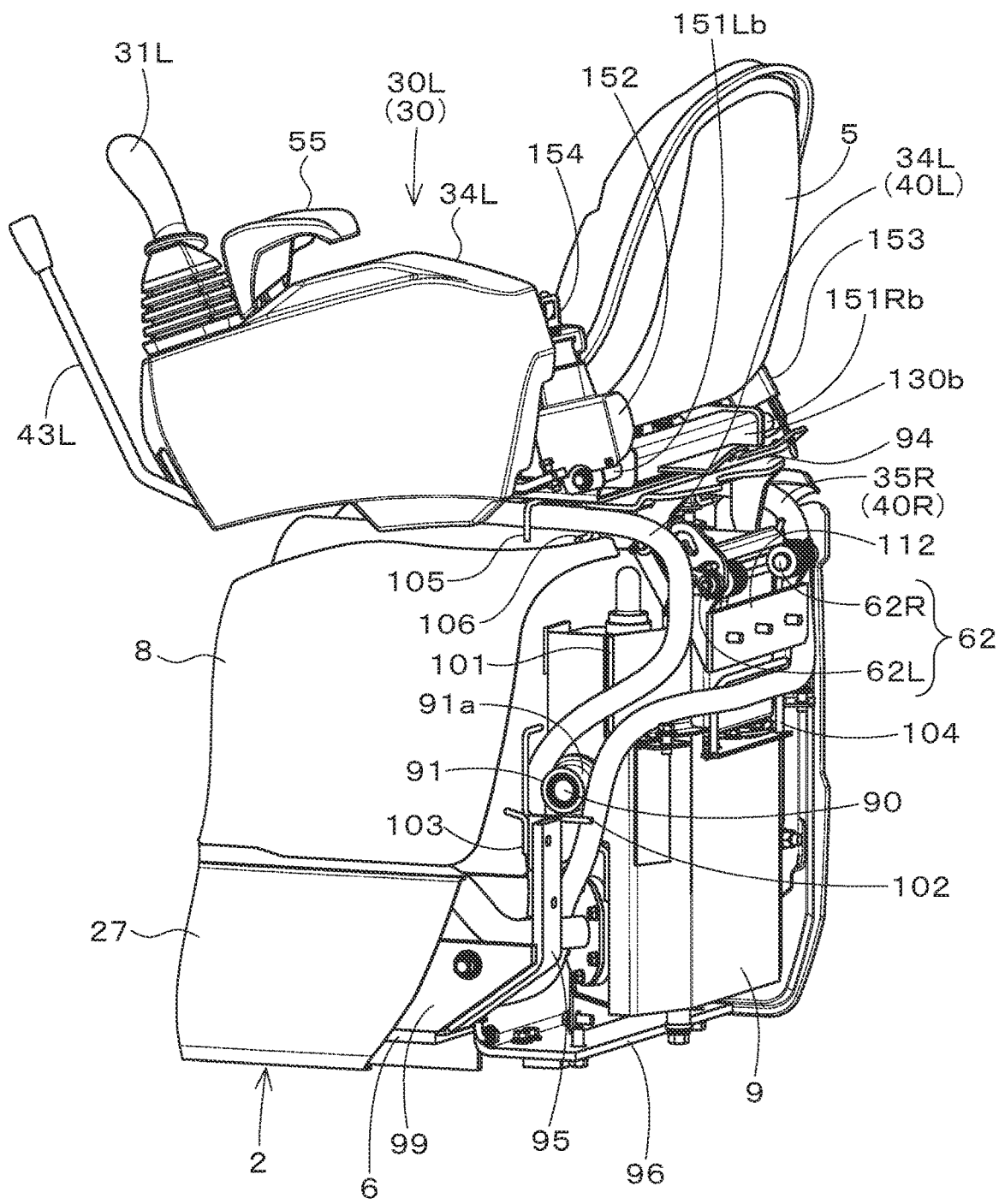
FIG. 7 is a rear perspective view illustrating, for example, the hydraulic hose arrangement.

The multiple (six) second pilot hoses 35R are connected to the second pilot valve 32R of the second operation device 30R although this is not illustrated. The second pilot hoses 35R connect the second operation device 30R and the control valves that are included in the valve unit 21 to each other. The second pilot hoses 35R are bundled into a second hose bundle 40R in the second casing 34R. As illustrated in FIG. 7, the second hose bundle 40R into which the multiple second pilot hoses 35R are bundled is inserted in the hood 8.

Pilot Hose Arrangement

Figure 6:
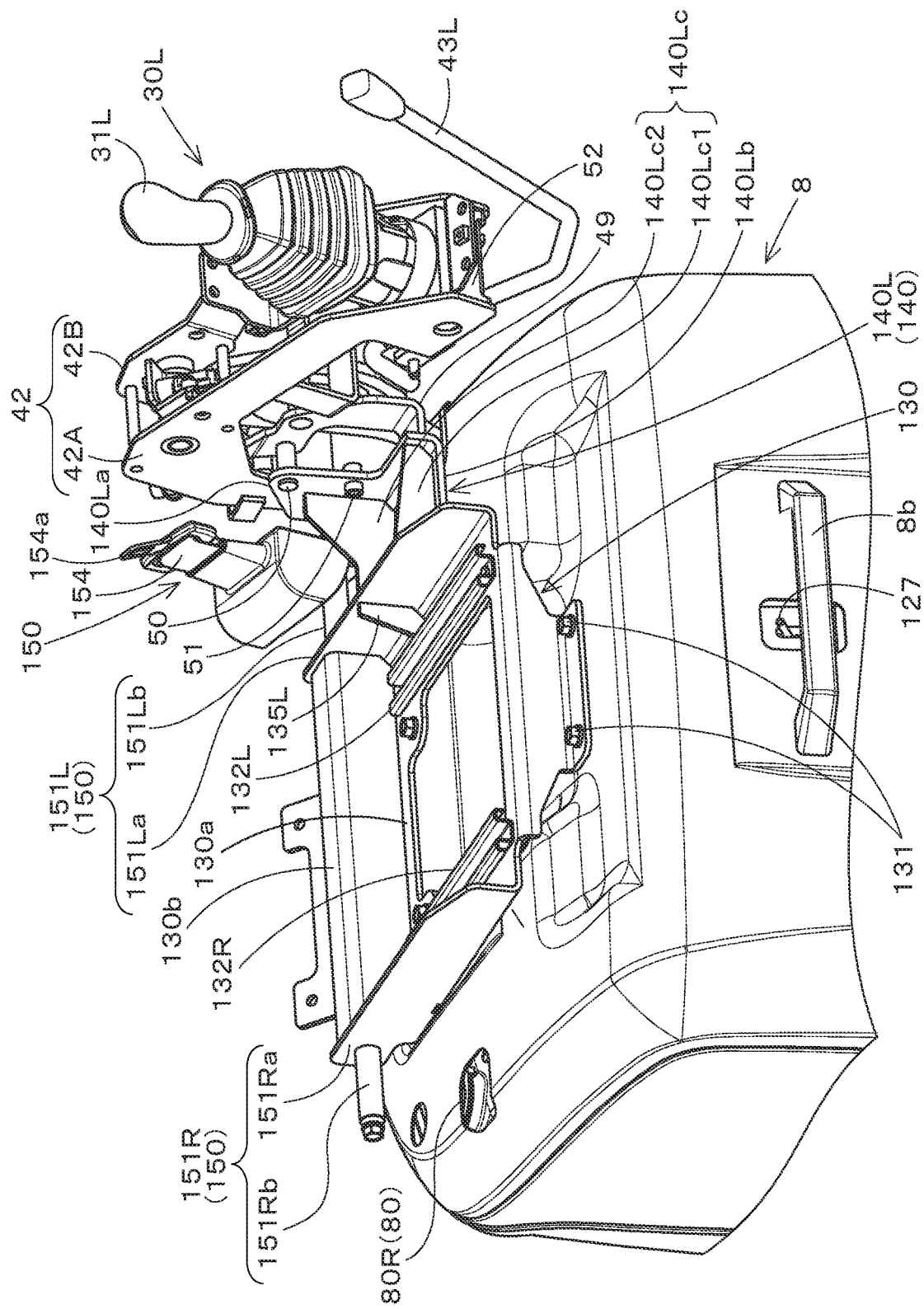
FIG. 6 is a front perspective view illustrating, for example, a seat bracket, a seat belt support, an operation bracket, and the first operation device.

The opening 80 of the hood 8 includes a first opening 80L (see FIG. 4) that is formed in a left-hand upper surface of the hood 8 and a second opening 80R (see FIG. 6) that is formed in the left-hand upper surface of the hood 8. In FIG. 4 and FIG. 6, an illustration for the second operation device 30R is omitted. The first pilot hoses 35L are inserted in the hood 8 via the first opening 80L. The second pilot hoses 35R are inserted in the hood 8 via the second opening 80R.

Figure 5:
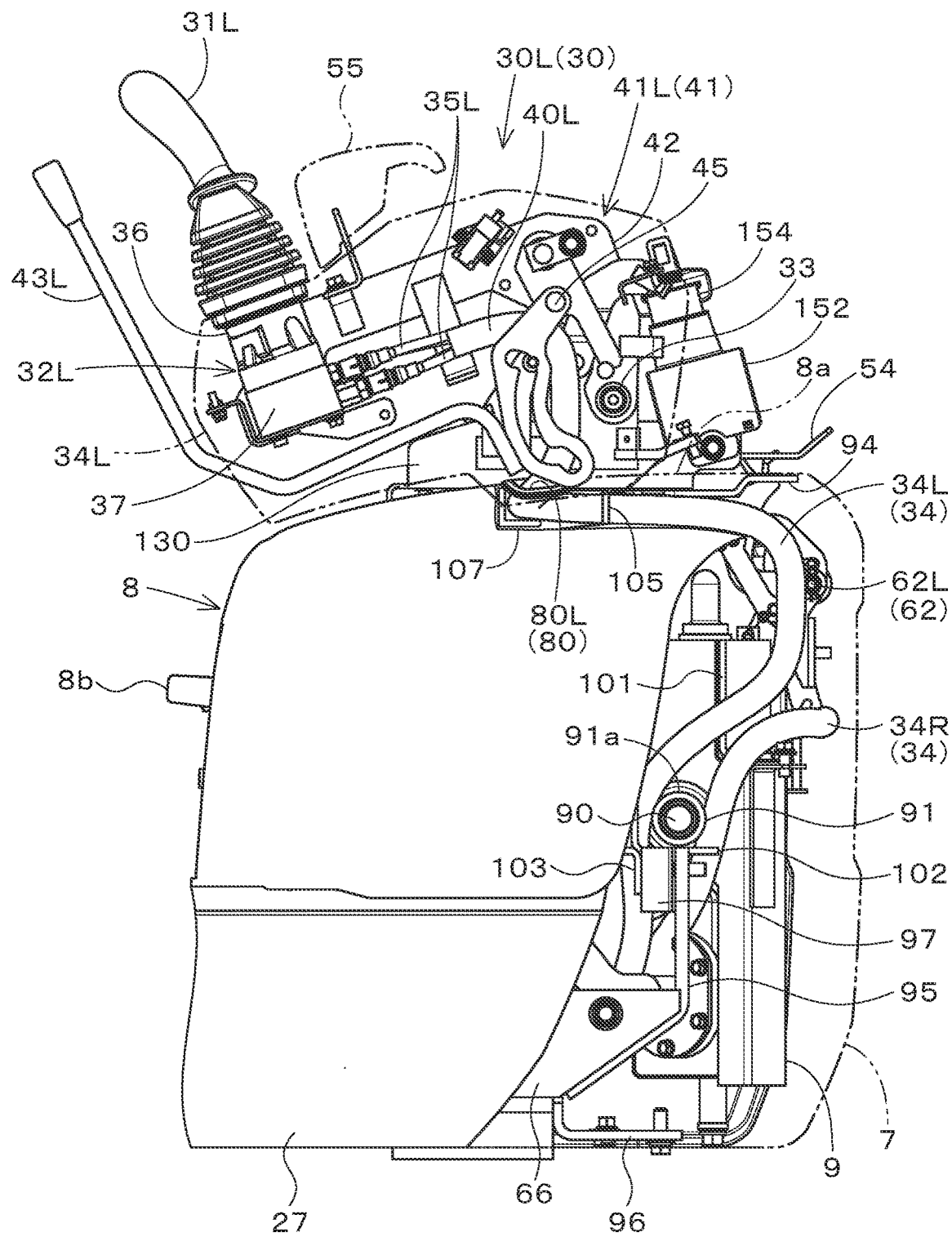
FIG. 5 is a side view illustrating, for example, hydraulic hose arrangement.

As illustrated in FIG. 5, the first pilot hoses 35L that are inserted in the hood 8 extend in the backward direction along a lower surface of an upper plate 8a of the hood 8, curve at a rear portion in the hood 8, and extend in the downward direction. The same is true for the second pilot hoses 35R although this is not illustrated.

As illustrated in FIG. 7, the first pilot hoses 35L and the second pilot hoses 35R extend so as to be separated toward a left-hand portion and a right-hand portion in the hood 8. The first pilot hoses 35L and the second pilot hoses 35R extend so as to be separated toward the left and the right of a horizontal shaft 62 on which the hood 8 pivots. More specifically, the first pilot hoses 35L extend through positions away from a first horizontal shaft 62L described later in the leftward direction. The second pilot hoses 35R extend through positions away from a second horizontal shaft 62R described later in the rightward direction.

As illustrated in FIG. 5 and FIG. 7, the first pilot hoses 35L extend through positions away from the hydraulic fluid tank 9 in the leftward direction and extend in the downward direction. The second pilot hoses 35R extend through positions away from the hydraulic fluid tank 9 in the backward direction so as to extend from positions away from the hydraulic fluid tank 9 in the rightward direction to positions away therefrom in the leftward direction, extend through the positions away from the hydraulic fluid tank 9 in the leftward direction, and extend in the downward direction. The hydraulic fluid tank 9 is disposed at a position away from the prime mover 10 in the backward direction and away from the weight 7 in the forward direction (see FIG. 25). The second pilot hoses 35R extend between the hydraulic fluid tank 9 and the weight 7 and extend from the right-hand portion to a left-hand portion in the hood 8.

As illustrated in FIG. 5, FIG. 7, FIG. 8, and FIG. 9, the hydraulic fluid tank 9 includes a viewing window 90 and a tubular portion 91. The viewing window 90 is a window through which the hydraulic fluid in the hydraulic fluid tank 9 is visible. The viewing window 90 is composed of a transparent plate such as a glass plate. The viewing window 90 functions as an oil gauge for checking the amount (a fluid surface) of the hydraulic fluid that is stored in the hydraulic fluid tank 9. As illustrated in FIG. 10, the viewing window 90 is visible from a position outside the machine body 2 through an opening 7a that is formed in a left-hand portion of the weight 7.

The tubular portion 91 includes the viewing window 90. The viewing window 90 is fitted in the interior of the tubular portion 91 at a tip portion of the tubular portion 91 and enables the hydraulic fluid in the hydraulic fluid tank 9 to be visible through an inner space of the tubular portion 91. The tubular portion 91 protrudes from a wall surface (a left-hand wall surface) of the hydraulic fluid tank 9. The tubular portion 91 preferably has a cylindrical shape as illustrated but may have an elliptical tube shape or a rectangular tube shape. According to the present embodiment, the tubular portion 91 has a cylindrical shape having an axial center that extends in a substantially horizontal direction and protrudes in the leftward direction from the left-hand wall surface of the hydraulic fluid tank 9.

The length of a protrusion of the tubular portion 91 (the length of the protrusion from the wall surface of the hydraulic fluid tank 9) is preferably set to a length equal to or more than the outer diameters of the hydraulic hoses (the first pilot hoses 35L and the second pilot hoses 35R). In this case, the length of the protrusion of the tubular portion 91 may be set to a length equal to or more than the outer diameter of at least one of the hydraulic hoses (the first pilot hoses 35L and the second pilot hoses 35R) but is preferably set to a length equal to or more than the outer diameter of the first hose bundle 40L into which the multiple first pilot hoses 35L are bundled and equal to or more than the outer diameter of the second hose bundle 40R into which the multiple second pilot hoses 35R are bundled. The outer diameter of the tubular portion 91 is preferably equal to or more than the outer diameter of the first hose bundle 40L and equal to or more than the outer diameter of the second hose bundle 40R.

The tubular portion 91 has an outer surface (an outer peripheral surface) 91a that guides the hydraulic hoses (the first pilot hoses 35L and the second pilot hoses 35R). The tubular portion 91 protrudes from the wall surface (the left-hand wall surface) of the hydraulic fluid tank 9 and can consequently guide the hydraulic hoses (the first pilot hoses 35L and the second pilot hoses 35R) with the hydraulic hoses being in contact with the outer surface 91a.

For convenience of the description below, the first pilot hoses 35L (or the first hose bundle 40L) are referred to as the first hydraulic hoses 35L, and the second pilot hoses 35R (or the second hose bundle 40R) are referred to as the second hydraulic hoses 35R in some cases.

As illustrated in FIG. 5, FIG. 7, FIG. 8, and FIG. 9, the first hydraulic hoses 35L and the second hydraulic hoses 35R are guided along the outer surface 91a of the tubular portion 91 opposite each other with the viewing window 90 interposed therebetween. Specifically, the first hydraulic hoses 35L are guided along the outer surface 91a of the tubular portion 91 in front of the viewing window 90, and the second hydraulic hoses 35R are guided along the outer surface 91a of the tubular portion 91 behind the viewing window 90. This enables two hydraulic hoses (the first hydraulic hose 35L and the second hydraulic hose 35R) to be separated from each other and guided and accordingly prevents the hydraulic hoses from being interfering with each other or entangled with each other.

As illustrated in FIG. 5, FIG. 7, FIG. 8, and FIG. 9, the hydraulic hoses (the first hydraulic hoses 35L and the second hydraulic hoses 35R) are guided by multiple guide members above and below the tubular portion 91. The multiple guide members include a first guide member 101, a second guide member 102, a third guide member 103, a fourth guide member 104, a fifth guide member 105, a sixth guide member 106, and a seventh guide member 107. The first guide member 101 to the seventh guide member 107 are acquired by folding round rods. However, the multiple guide members do not necessarily include all of the first to seventh guide members, but one or multiple guide members may be omitted. Another guide member may be added as needed.

Figure 8:
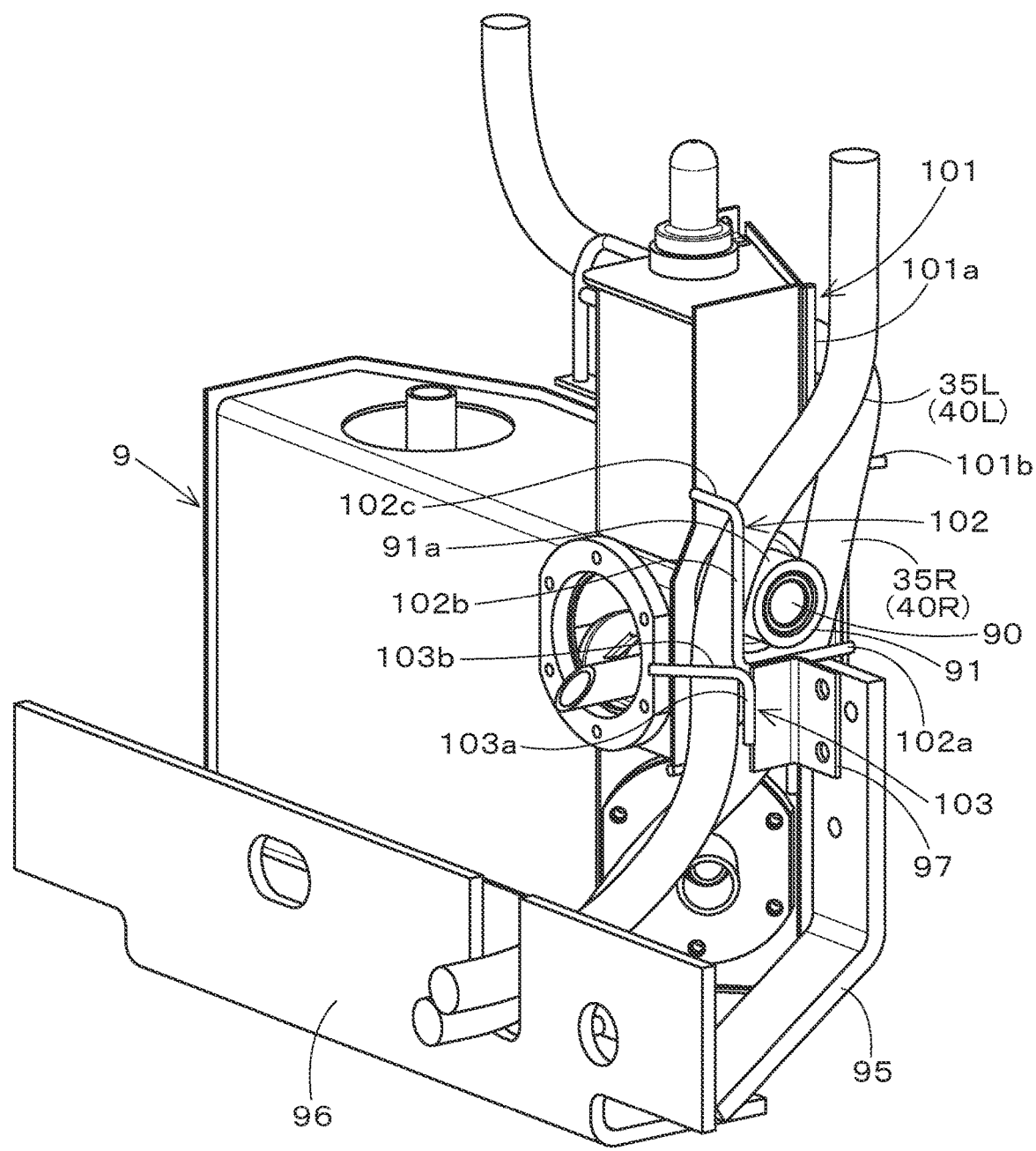
FIG. 8 is a front perspective view illustrating, for example, a hydraulic fluid tank and hydraulic hoses.
Figure 9:
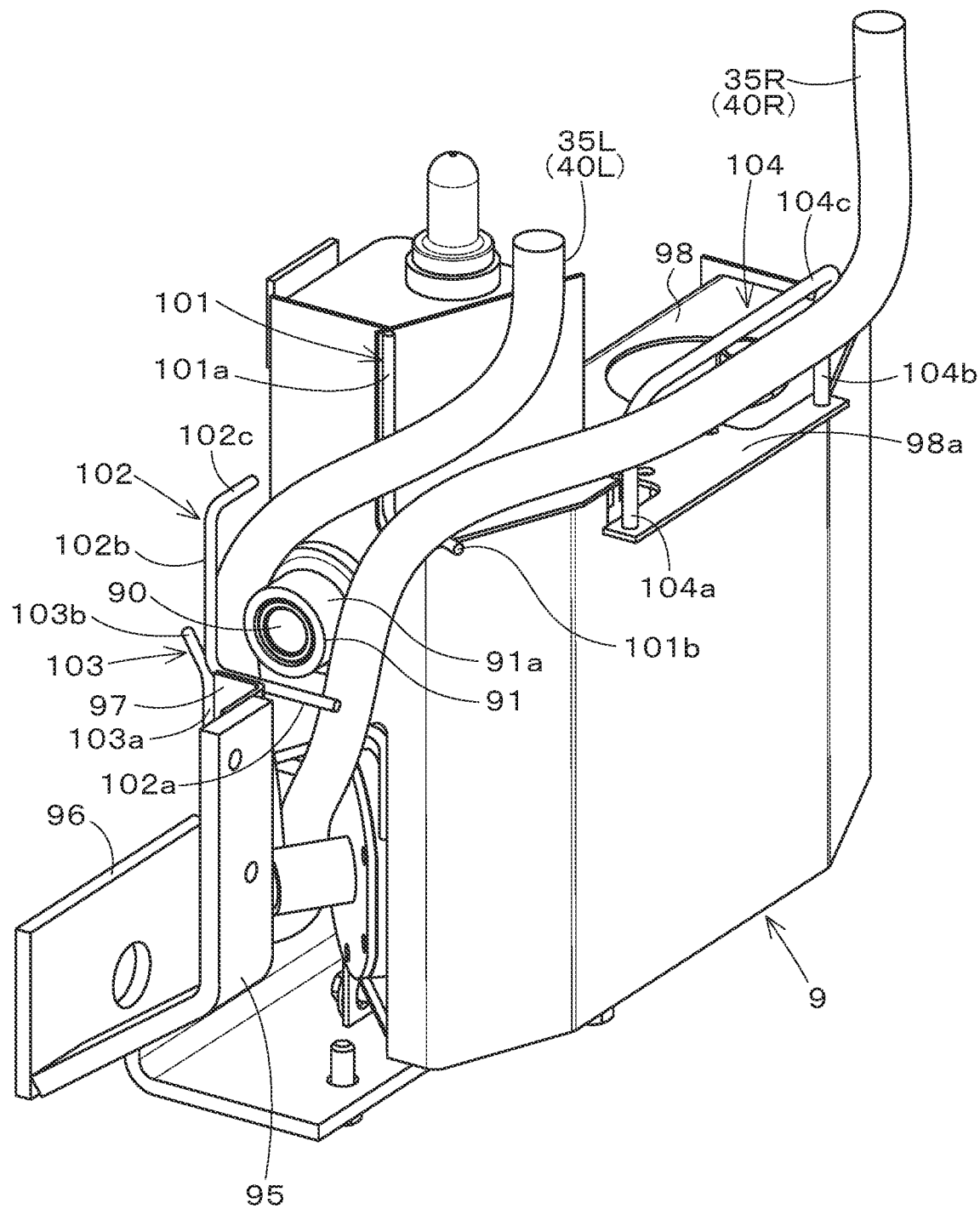
FIG. 9 is a rear perspective view illustrating, for example, the hydraulic fluid tank and the hydraulic hoses.
Figure 10:
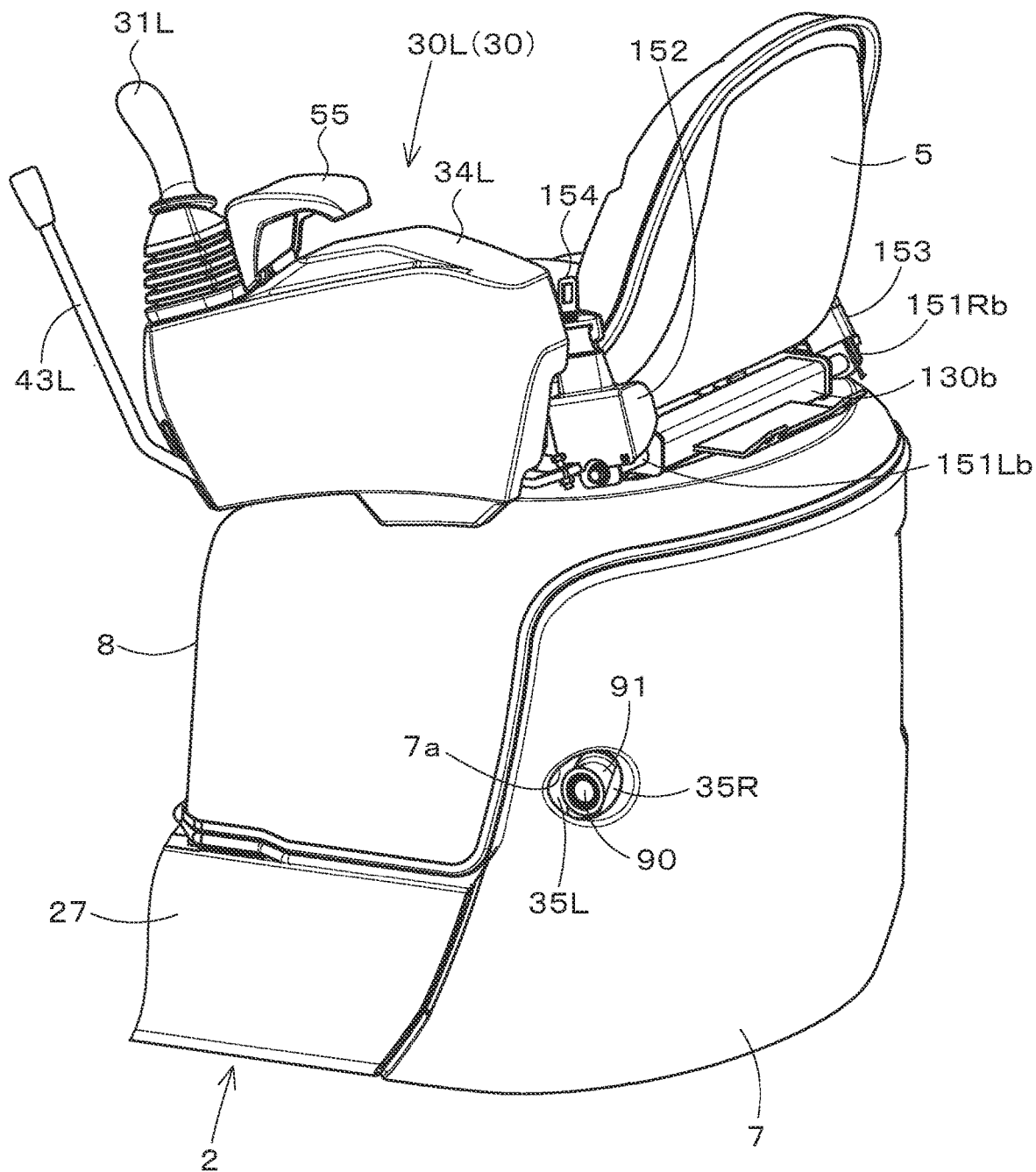
FIG. 10 is a rear perspective view of, for example, a machine body.

As illustrated in FIG. 7, FIG. 8, and FIG. 9, the first guide member 101 guides the hydraulic hoses (the first hydraulic hoses 35L and the second hydraulic hoses 35R) toward the tubular portion 91. The first guide member 101 is mounted on the hydraulic fluid tank 9. The first guide member 101 is mounted along a corner edge of the hydraulic fluid tank 9. The first guide member 101 is mounted along the corner edge of a left-hand rear portion of the hydraulic fluid tank 9. The first guide member 101 includes a vertical portion 101a that extends in the upward and downward directions along the corner edge of the hydraulic fluid tank 9 and a horizontal portion 101b that bends at a lower end of the vertical portion 101a and that extends in the backward direction. The first hydraulic hoses 35L are in contact with the vertical portion 101a and are guided. The second hydraulic hoses 35R are in contact with the horizontal portion 101b and are guided.

As illustrated in FIG. 7, FIG. 8, and FIG. 9, the second guide member 102 guides the hydraulic hoses (the first hydraulic hoses 35L and the second hydraulic hoses 35R) that extend along the tubular portion 91. The second guide member 102 is mounted on the turn plate 6 (see FIG. 25) with a stay 95 interposed therebetween. The stay 95 is connected to a partition member 96 with a connection plate 99 (see FIG. 7) interposed therebetween. The partition member 96 is fixed to the turn plate 6 by using a bolt. The partition member 96 extends in the width direction of the machine body away from the hydraulic fluid tank 9 in the forward direction.

The second guide member 102 is fixed to the stay 95 with a mounting plate 97 interposed therebetween. The mounting plate 97 is fixed to an upper portion of the stay 95 by using a fastener (not illustrated) such as a bolt. The second guide member 102 includes a lower portion 102a, a middle portion 102b, and an upper portion 102c. The lower portion 102a is mounted on the mounting plate 97 and extends in the forward and backward directions below the tubular portion 91. The middle portion 102b bends at a front end of the lower portion 102a and extends in the upward direction. The middle portion 102b extends from a position below the tubular portion 91 to a position above the tubular portion 91 away from the tubular portion 91 in the forward direction. The upper portion 102c bends at an upper end of the middle portion 102b and extends in the rightward direction (the direction toward the hydraulic fluid tank 9). The hydraulic hoses (the first hydraulic hoses 35L and the second hydraulic hoses 35R) extend between the second guide member 102 and the wall surface (the left-hand wall surface) of the hydraulic fluid tank 9. The first hydraulic hoses 35L extend between the middle portion 102b and the wall surface (the left-hand wall surface) of the hydraulic fluid tank 9 below the upper portion 102c. The second hydraulic hoses 35R extend between the lower portion 102a and the wall surface (the left-hand wall surface) of the hydraulic fluid tank 9.

As illustrated in FIG. 7, FIG. 8, and FIG. 9, the third guide member 103 guides the hydraulic hoses (the first hydraulic hoses 35L) that extend along the tubular portion 91. The third guide member 103 is mounted on the turn plate 6 with the stay 95 interposed therebetween. The third guide member 103 is mounted on the mounting plate 97 that is fixed to the upper portion of the stay 95. The third guide member 103 includes a vertical portion 103a and a horizontal portion 103b. The vertical portion 103a is mounted on the mounting plate 97 and extends in the upward and downward directions below the second guide member 102. The horizontal portion 103b bends at an upper end of the vertical portion 103a and extends obliquely in the forward and rightward directions. The first hydraulic hoses 35L extend between the horizontal portion 103b and the hydraulic fluid tank 9 in the downward direction.

As illustrated in FIG. 7 and FIG. 9, the fourth guide member 104 guides the hydraulic hoses (the second hydraulic hoses 35R) toward the tubular portion 91. The fourth guide member 104 is mounted on an upper plate 98 that is mounted on an upper surface of the hydraulic fluid tank 9. The upper plate 98 includes a protrusion 98a that protrudes in the backward direction from the upper surface of the hydraulic fluid tank 9. The fourth guide member 104 is mounted on the protrusion 98a. For this reason, the fourth guide member 104 is disposed at a position away from the hydraulic fluid tank 9 in the backward direction. The fourth guide member 104 includes a first vertical portion 104a that extends from a left-hand portion of the upper plate 98 in the upward direction, a second vertical portion 104b that extends from a right-hand portion of the upper plate 98 in the upward direction, and a communication portion 104c that connects an upper end of the first vertical portion 104a and an upper end of the second vertical portion 104b to each other. Upper portions of the first vertical portion 104a and the second vertical portion 104b curve in the backward direction. The second hydraulic hoses 35R are disposed below the communication portion 104c away from the first vertical portion 104a and the second vertical portion 104b in the backward direction. The second hydraulic hoses 35R are in contact with the fourth guide member 104 and extend in the leftward direction from a position in the rightward direction away from the hydraulic fluid tank 9 in the backward direction.

As illustrated in FIG. 5 and FIG. 7, the fifth guide member 105, the sixth guide member 106, and the seventh guide member 107 guide the hydraulic hoses (the first hydraulic hoses 35L and the second hydraulic hoses 35R) in the backward direction from positions in the forward direction along an upper portion in the hood 8. The fifth guide member 105, the sixth guide member 106, and the seventh guide member 107 are disposed along a left-hand upper portion and a right-hand upper portion in the hood 8. The fifth guide member 105 and the seventh guide member 107 are mounted on a back surface of the upper plate of the hood 8. The sixth guide member 106 is mounted on a rear plate 94 that is fixed to a rear, lower surface of the hood 8.

The fifth guide member 105 is disposed at a position away from the opening 80 that is formed in the hood 8 in the backward direction. The sixth guide member 106 is disposed at a position away from the fifth guide member 105 in the backward direction. The seventh guide member 107 extends in the downward direction from a position away from the opening 80 in the forward direction. The fifth guide member 105 restricts movement of the hydraulic hoses (the first hydraulic hoses 35L and the second hydraulic hoses 35R) in the upward direction and in the outward direction with respect to the machine body. The sixth guide member 106 restricts movement of the hydraulic hoses (the first hydraulic hoses 35L and the second hydraulic hoses 35R) in the downward direction and in the inward direction with respect to the machine body. The seventh guide member 107 restricts movement of the hydraulic hoses (the first hydraulic hoses 35L and the second hydraulic hoses 35R) in the forward direction and in the downward direction.

The first hydraulic hoses 35L are inserted in the hood 8 via the first opening 80L of the left-hand upper portion of the hood 8, are guided along the upper plate of the hood 8 in the backward direction by using the fifth guide member 105, the sixth guide member 106, and the seventh guide member 107, bend at a left-hand rear portion in the hood 8, extend in the downward direction, are guided toward the tubular portion 91 by using the first guide member 101, are guided along the outer surface 91a of a front portion of the tubular portion 91 and the second guide member 102, further extend in the downward direction, and are further guided in the downward direction by using the third guide member 103.

The second hydraulic hoses 35R are inserted in the hood 8 via the second opening 80R of the right-hand upper portion of the hood 8, are guided along the upper plate of the hood 8 in the backward direction by using the fifth guide member 105, the sixth guide member 106, and the seventh guide member 107, bend at a right-hand rear portion in the hood 8, extend in the downward direction, are guided from the right-hand portion to the left-hand portion by using the fourth guide member 104, are guided toward the tubular portion 91 by using the first guide member 101, are guided along the outer surface 91a of a rear portion of the tubular portion 91, further extend in the downward direction, further extend between the second guide member 102 and the wall surface of the hydraulic fluid tank 9, and further extend in the downward direction.

The first hydraulic hoses 35L and the second hydraulic hoses 35R that extend in the downward direction bend at a lower portion in the hood 8, extend in the forward direction, and are connected to the control valves that are included in the valve unit 21.

Open-close Structure of Hood

Figure 11:
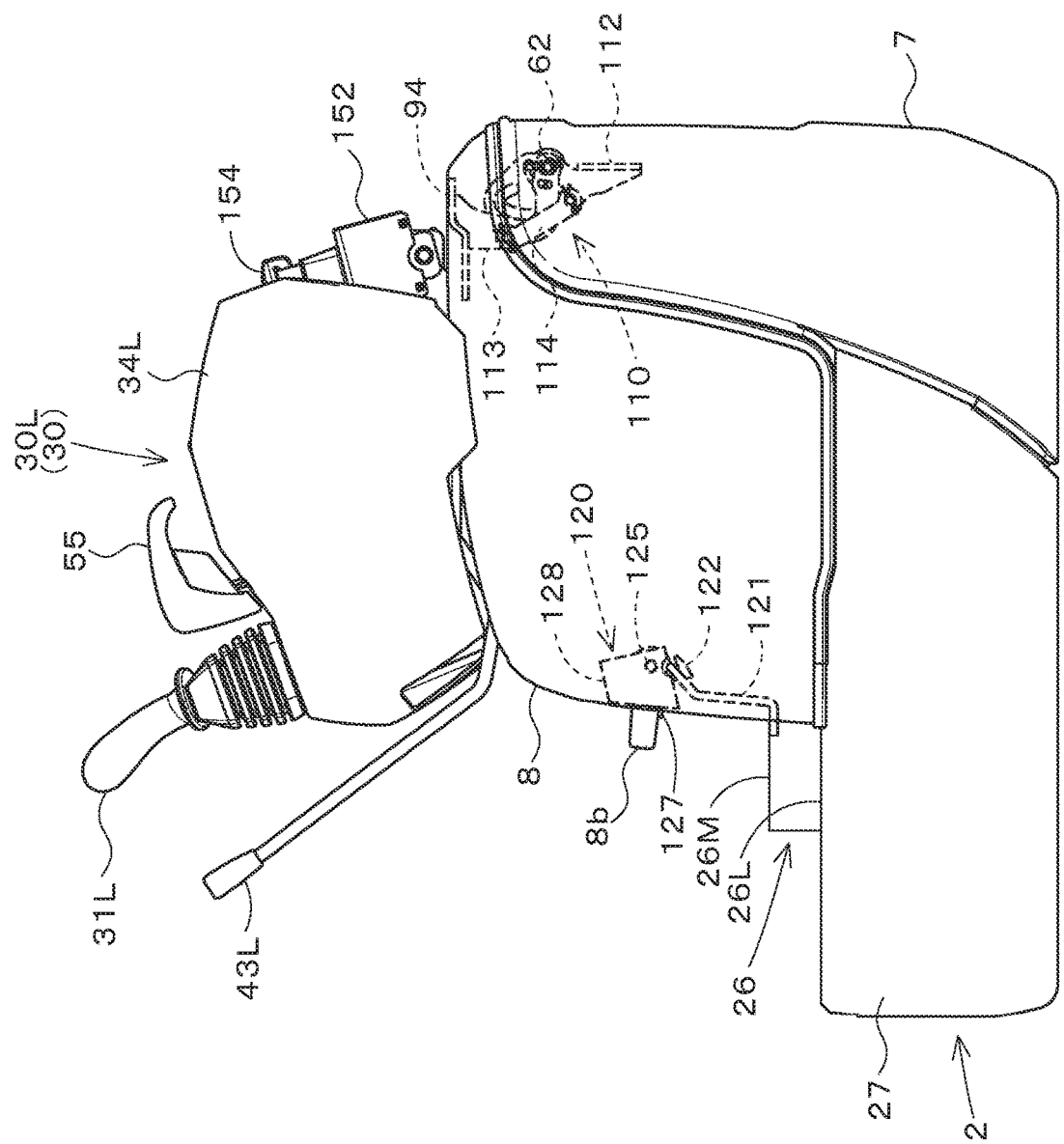
FIG. 11 is a side view when the hood is in a blocking position.
Figure 12:
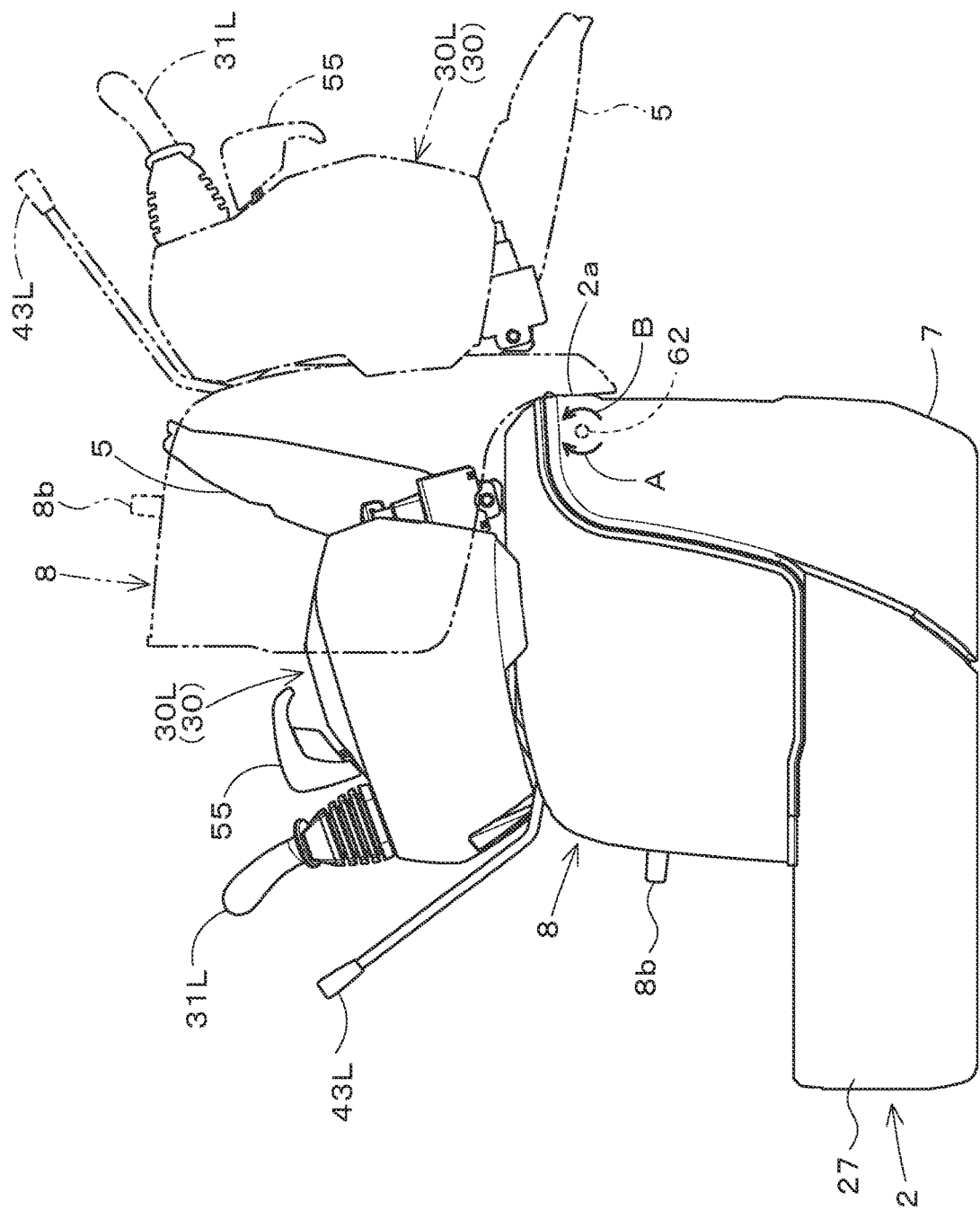
FIG. 12 is a side view illustrating the blocking position and an uncovering position of the hood.

As illustrated in FIG. 11, the machine body 2 includes the horizontal shaft 62 that supports the hood 8 such that the hood 8 is pivotable (openable and closable). The horizontal shaft 62 extends in the width direction of the machine body. A rear, lower portion of the hood 8 is supported so as to be pivotable on the horizontal shaft 62 with respect to the machine body 2. As illustrated in FIG. 12, the hood 8 opens by pivoting on the horizontal shaft 62 in a first direction (the direction of an arrow A) and closes by pivoting on the horizontal shaft 62 in a second direction (the direction of an arrow B). This enables the hood 8 to move to an uncovering position (a position illustrated by using imaginary lines in FIG. 12) in which a front portion is raised and a blocking position (a position illustrated by using solid lines in FIG. 12) in which the front portion is lowered.

As illustrated in FIG. 11, the working machine 1 includes an assist mechanism 110 that assists a force required for opening or closing the hood 8. The assist mechanism 110 urges a spring force for assisting the hood 8 in pivoting on the horizontal shaft 62. The assist mechanism 110 urges the spring force for assisting in pivoting in the first direction (the direction of the arrow A) when the hood 8 is opened and urges the spring force for assisting in pivoting in the second direction (the direction of the arrow B) when the hood 8 is closed.

Figure 13:
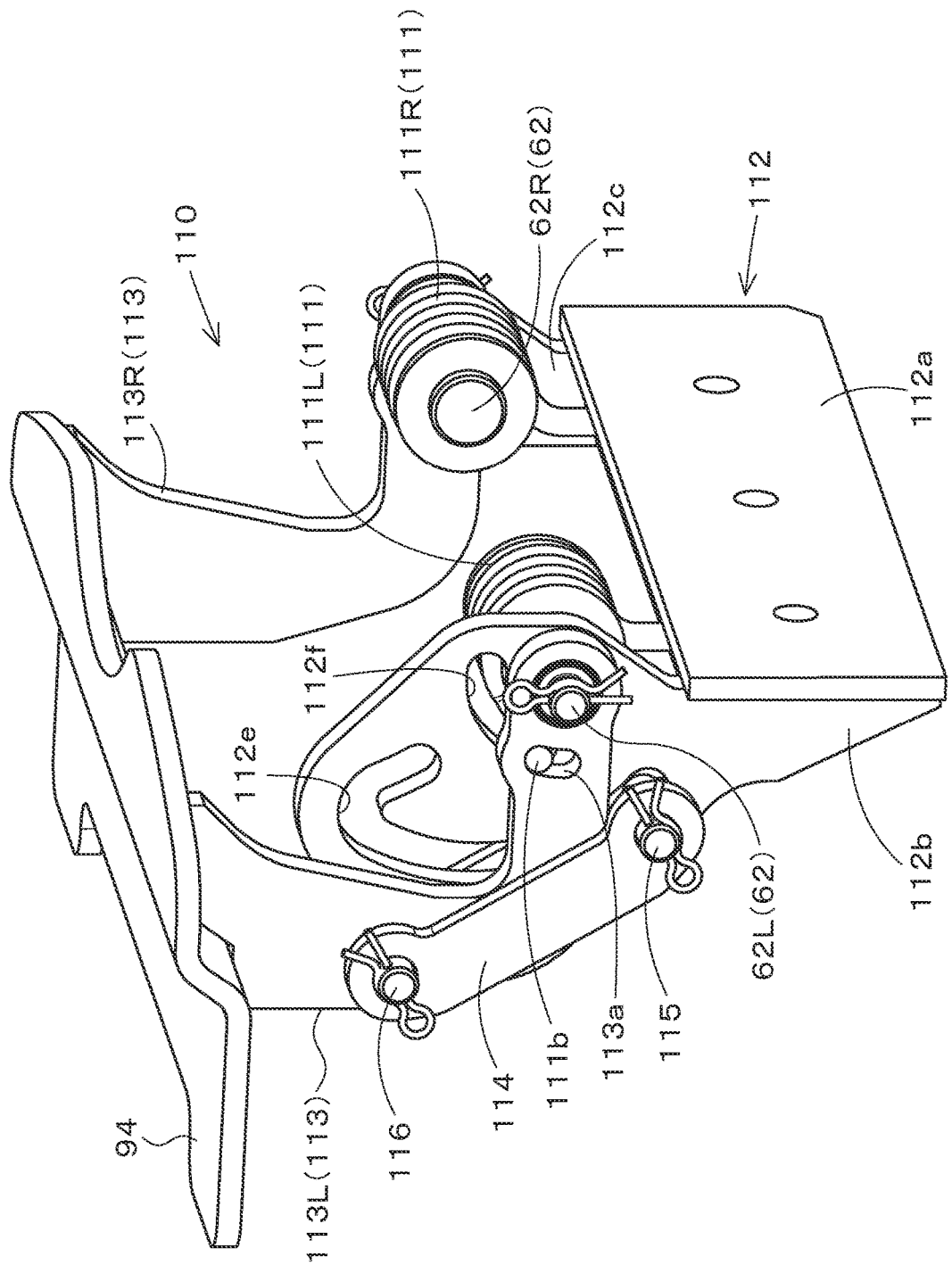
FIG. 13 is a rear perspective view of an assist mechanism.
Figure 14:
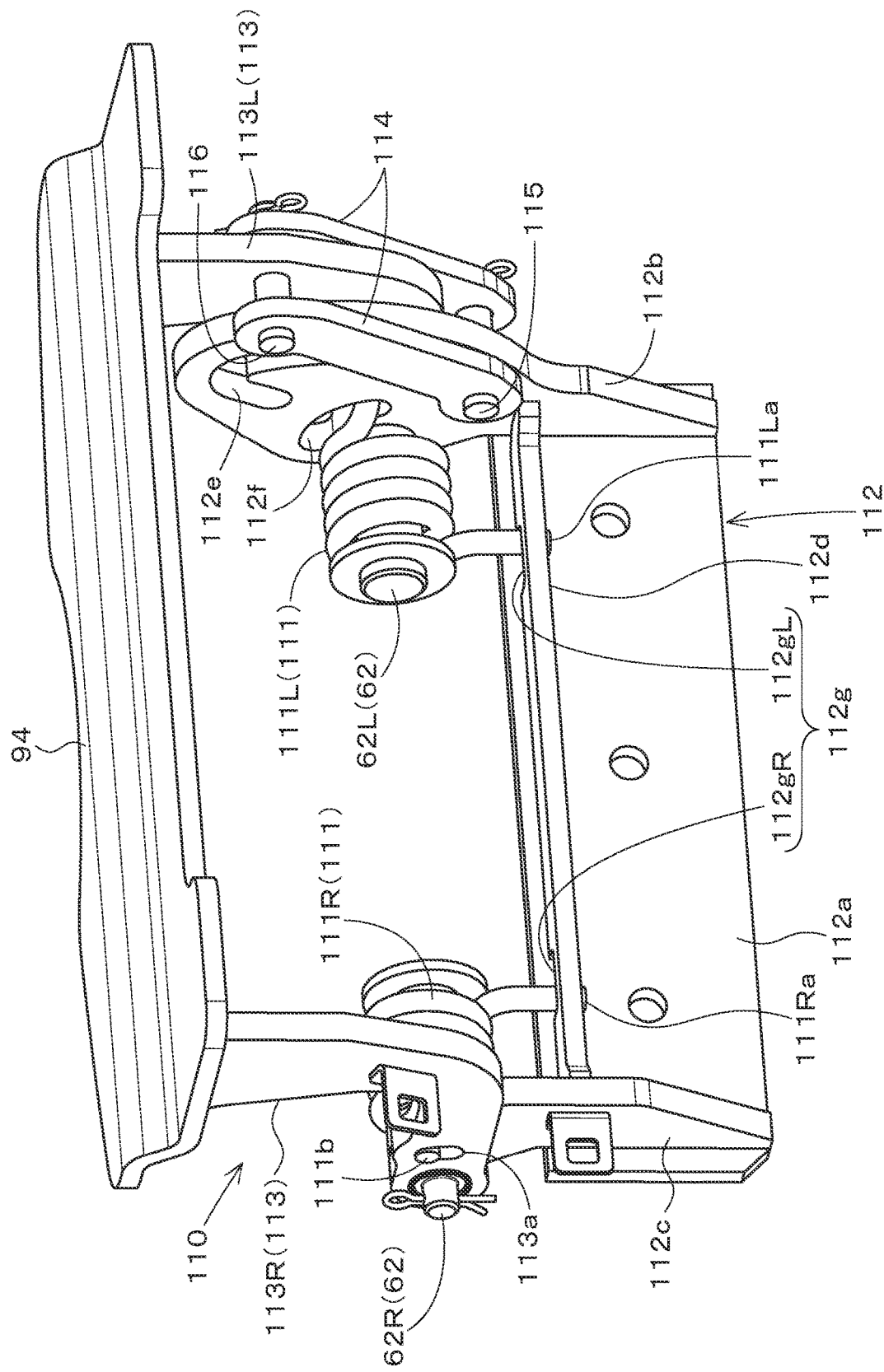
FIG. 14 is a front perspective view of the assist mechanism.
Figure 15:
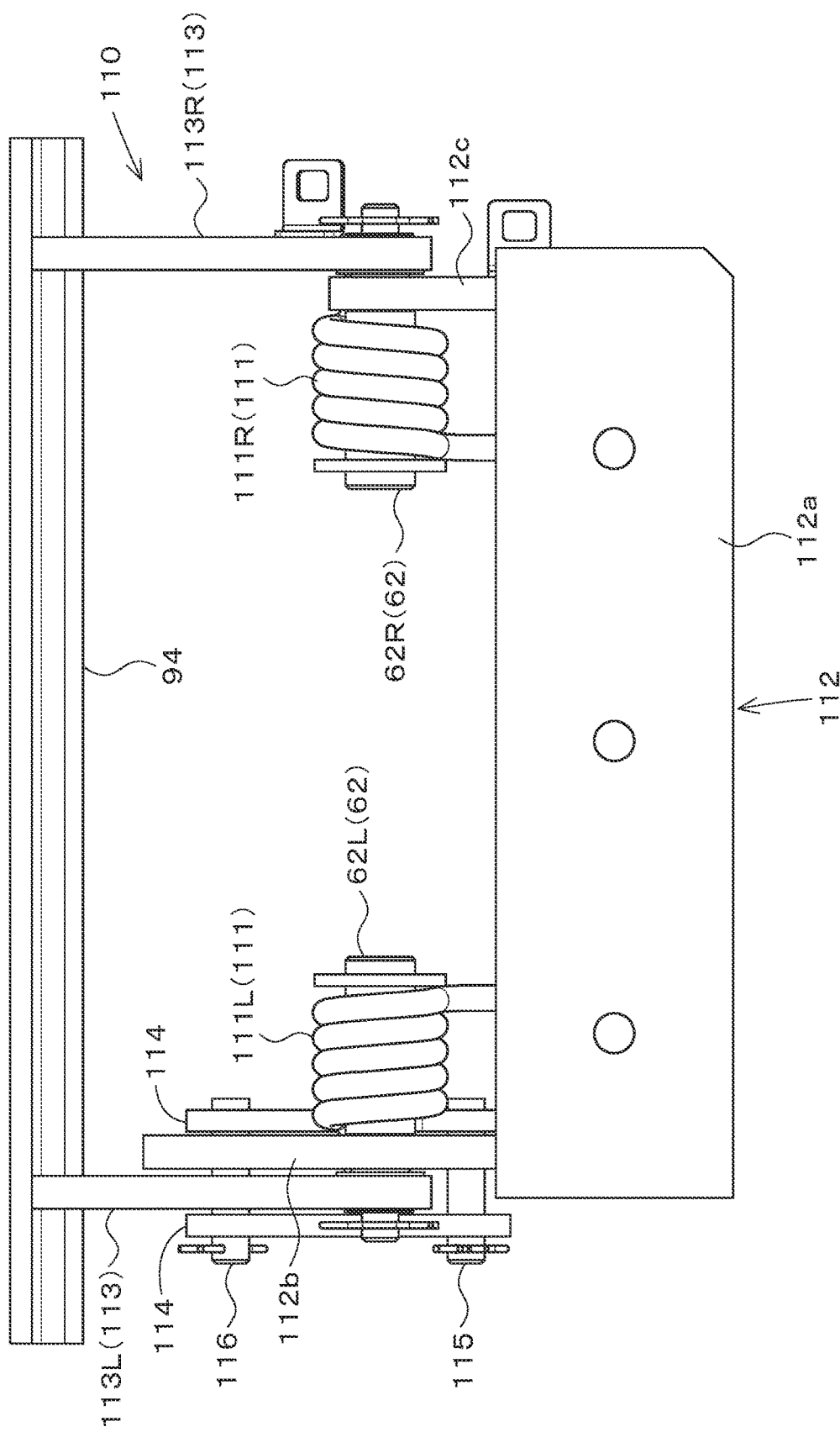
FIG. 15 is a rear view of the assist mechanism.

As illustrated in FIG. 13, FIG. 14, and FIG. 15, the horizontal shaft 62 includes the first horizontal shaft 62L that is disposed at a position in the width direction of the machine body (on the left) and the second horizontal shaft 62R that is disposed at another position in the width direction of the machine body (on the right). The first horizontal shaft 62L and the second horizontal shaft 62R are disposed at an interval in the width direction of the machine body on a single straight line that extends in the width direction of the machine body. The assist mechanism 110 includes a helical torsion spring 111 that is wound around the horizontal shaft 62 and that urges the spring force described above. The helical torsion spring 111 includes a first spring 111L that is wound around the first horizontal shaft 62L and a second spring 111R that is wound around the second horizontal shaft 62R.

As illustrated in FIG. 13, FIG. 14, FIG. 15, and FIG. 16, the assist mechanism 110 includes a first member 112, a second member 113, and a linkage member 114.

The first member 112 is fixed to the machine body 2. Specifically, the first member 112 is fixed to the weight 7 that is disposed at the rear portion of the machine body 2. The first member 112 includes a rear plate 112a, a first side plate 112b, a second side plate 112c, and an upper plate 112d. The rear plate 112a is fixed to a front portion of the weight 7 by using, for example, a bolt. The first side plate 112b and the second side plate 112c are disposed at an interval in the width direction of the machine body and are connected to a front surface of the rear plate 112a. The first side plate 112b is disposed at a position in the width direction of the machine body (on the left). The second side plate 112c is disposed at another position in the width direction of the machine body (on the right). The upper plate 112d extends from an upper portion of the rear plate 112a in the forward direction.

The first side plate 112b of the first member 112 has a guide hole 112e and a through-hole 112f. The guide hole 112e is a hole for guiding movement of a first shaft 115 described later. The guide hole 112e has a substantially C-shape. The through-hole 112f is a hole through which a second end portion 111b of the helical torsion spring 111 (the first spring 111L) extends. The through-hole 112f includes a long hole that extends into an arc shape with the horizontal shaft 62 centered.

The second member 113 is fixed to the hood 8. Specifically, the second member 113 is fixed to the hood 8 with the rear plate 94 that is fixed to the rear, lower surface of the hood 8 interposed therebetween. The second member 113 is supported by the horizontal shaft 62 with respect to the first member 112 and is pivotable on the horizontal shaft 62. The second member 113 includes a left-hand member 113L and a right-hand member 113R. As for the left-hand member 113L, a first end portion is fixed to a lower surface of a left-hand portion of the rear plate 94, extends from the lower surface in the downward direction, and bends in the backward direction. As for the right-hand member 113R, a first end portion is fixed to a lower surface of a right-hand portion of the rear plate 94, extends from the lower surface in the downward direction, and bends in the backward direction. A second end portion of the left-hand member 113L is supported by the first horizontal shaft 62L. A second end portion of the right-hand member 113R is supported by the second horizontal shaft 62R.

As for the linkage member 114, a first end is mounted on the first member 112 by using the first shaft 115, and a second end is mounted on the second member 113 by using a second shaft 116. The first shaft 115 is inserted in the guide hole 112e that is formed in the first member 112. The guide hole 112e guides movement of the first shaft 115 along with pivot movement of the hood 8 on the horizontal shaft 62.

The helical torsion spring 111 is locked on the first member 112 and the second member 113. The first member 112 includes a first lock 112g on which a first end portion of the helical torsion spring 111 is locked. The second member 113 includes a second lock 113a on which a second end portion of the helical torsion spring 111 is locked.

As illustrated in FIG. 14, the first lock 112g has notches 112gL and 112gR that are formed on the upper plate 112d of the first member 112. A first end portion 111La of the first spring 111L is locked in the notch 112gL. A first end portion 111Ra of the second spring 111R is locked in the notch 112gR.

Figure 16:
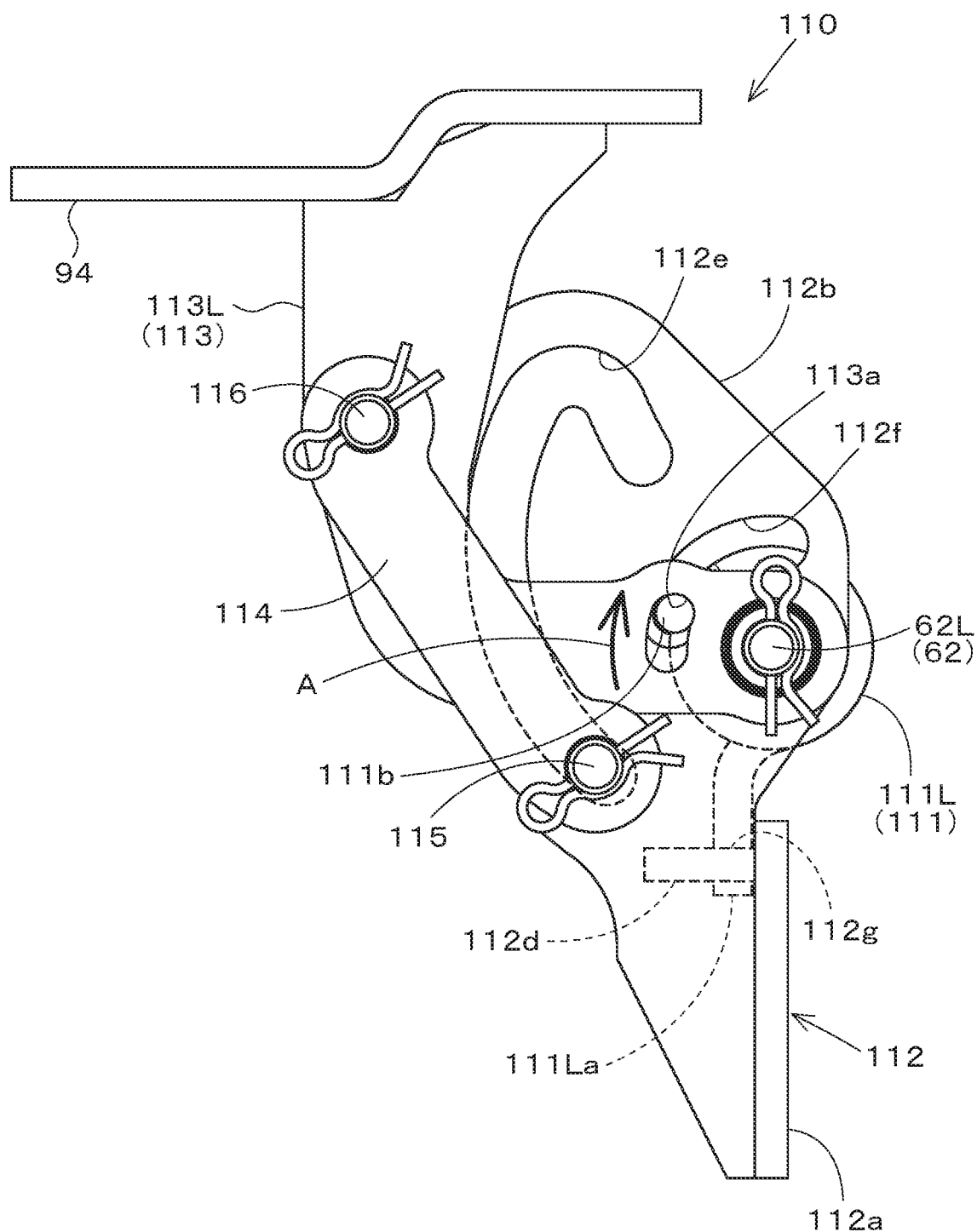
FIG. 16 is a side view of the assist mechanism when the hood is in the blocking position.

As illustrated in, for example, FIG. 16, the second lock 113a has a long hole that extends into an arc shape with the horizontal shaft 62 centered. The second end portion 111b of the helical torsion spring 111 is locked in the long hole of the second lock 113a that extends through the through-hole 112f of the first member 112. The second end portion 111b of the helical torsion spring 111 moves along the long hole of the second lock 113a along with opening or closing the hood 8. The second end portion 111b of the helical torsion spring 111 is located at a first edge (an upper edge) of the long hole of the second lock 113a when the hood 8 is closed (see FIG. 16) and is located at a second edge (a lower edge) of the long hole when the hood 8 is opened (see FIG. 17). The second end portion 111*b* of the helical torsion spring 111 is located in an intermediate portion in the long hole of the second lock 113*a* when the hood 8 is between the uncovering position (fully opened) and the blocking position (see FIG. 18).

FIG. 16 illustrates the state of the assist mechanism 110 when the hood 8 is closed. When the hood 8 is closed, the first shaft 115 is located at a first edge (a lower edge) of the guide hole 112*e*, and the second end portion 111*b* of the helical torsion spring 111 is located at the first edge (the upper edge) of the long hole of the second lock 113*a*. In this state, the helical torsion spring 111 urges the spring force in the direction of the arrow A (the first direction) against the second member 113. For this reason, when the operator opens the hood 8, the helical torsion spring 111 urges the spring force for assisting in pivoting in the first direction (a direction in which the hood 8 is opened). This enables the operator to readily open the hood 8 with a small force.

Figure 17:
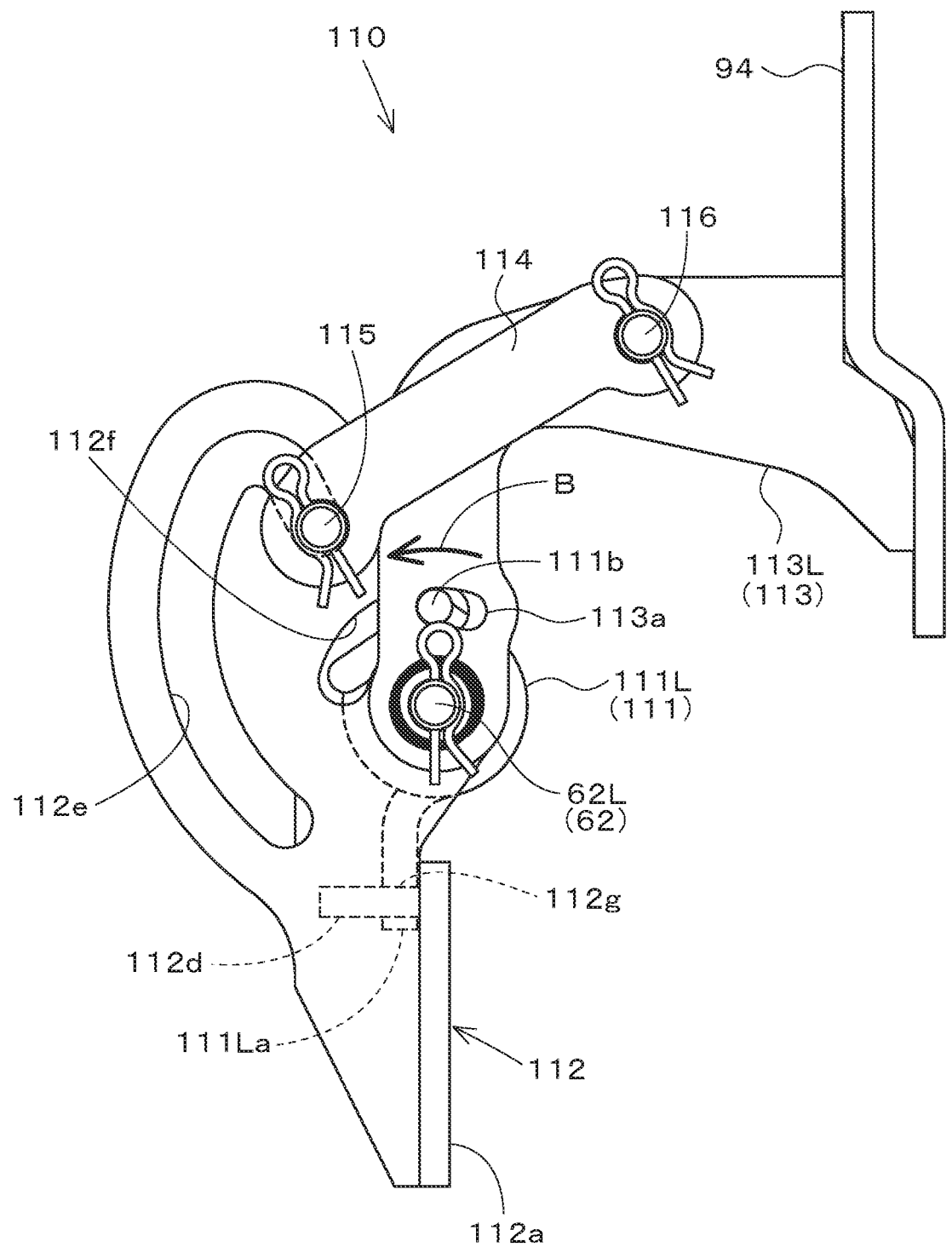
FIG. 17 is a side view of the assist mechanism when the hood is in the uncovering position.

FIG. 17 illustrates the state of the assist mechanism 110 when the hood 8 is opened (fully opened). When the hood 8 is opened, the first shaft 115 is located at a second edge (an upper edge) of the guide hole 112*e*. The second end portion 111*b* of the helical torsion spring 111 is located at the second edge (the lower edge) of the long hole of the second lock 113*a*. In this state, the helical torsion spring 111 urges the spring force in the direction of the arrow B (the second direction) against the second member 113. For this reason, when the operator closes the hood 8, the helical torsion spring 111 urges the spring force for assisting in pivoting in the second direction (a direction in which the hood 8 is closed). This enables the operator to readily close the hood 8 with a small force.

The direction in which the helical torsion spring 111 urges the spring force is the first direction when the hood 8 is in the blocking position and is the second direction when the hood 8 is in the uncovering position as described above. For this reason, the assist mechanism 110 can assist in pivoting in the first direction (the direction in which the hood is opened) when the hood 8 is opened and can assist in pivoting in the second direction (the direction in which the hood is closed) when the hood 8 is closed.

The assist mechanism 110 changes the direction in which the helical torsion spring 111 urges the spring force when the hood 8 is in an intermediate position between the blocking position and the uncovering position. Specifically, when the hood 8 moves (pivots) from the blocking position to the uncovering position, the direction in which the helical torsion spring 111 urges the spring force is changed from the first direction into the second direction in the intermediate position between the blocking position and the uncovering position. When the hood 8 moves (pivots) from the uncovering position to the blocking position, the assist mechanism 110 changes the direction in which the helical torsion spring 111 urges the spring force from the second direction into the first direction in the intermediate position between the uncovering position and the blocking position.

More specifically, the assist mechanism 110 assists in pivoting in the first direction (the direction in which the hood is opened) when the center of gravity of the pivot portion that pivots together with the hood 8 is located at a position away from a rear end 2*a* of the machine body 2 in the forward direction and assists in pivoting in the second direction (the direction in which the hood is closed) when the center of gravity of the pivot portion is located at a position away from the rear end 2*a* of the machine body 2 in the backward direction. According to the present embodiment, the pivot that pivots together with the hood 8 includes the hood 8, the operator's seat 5, and the operation device 30. In FIG. 12, when the pivot that pivots together with the hood 8 is located at the position illustrated by using the solid lines (when the hood 8 is in the blocking position), the center of gravity of the pivot is located at a position away from the rear end 2*a* of the machine body 2 in the forward direction, and accordingly, the assist mechanism 110 assists in pivoting in the first direction (the direction of the arrow A). When the pivot that pivots together with the hood 8 is located at the position illustrated by using the imaginary lines (when the hood 8 is in the uncovering position), the center of gravity of the pivot is located at a position away from the rear end 2*a* of the machine body 2 in the backward direction, and accordingly, the assist mechanism 110 assists in pivoting in the second direction (the direction of the arrow B).

The assist mechanism 110 preferably switches between a state for assisting in pivoting in the first direction (a state in which the direction in which the helical torsion spring 111 urges the spring force is the first direction) and a state for assisting in pivoting in the second direction (a state in which the direction in which the helical torsion spring 111 urges the spring force is the second direction) depending on the pivot angle of the hood 8 on the horizontal shaft 62.

In this case, the assist mechanism 110 can assist in pivoting in the first direction when the pivot angle at which the hood 8 pivots on the horizontal shaft 62 from the blocking position to the uncovering position ranges from the blocking position to a first angle and can assist in pivoting in the second direction when the pivot angle ranges from a second angle to the uncovering position. The assist mechanism 110 does not assist the hood 8 in pivoting when the pivot angle at which the hood 8 pivots on the horizontal shaft 62 from the blocking position to the uncovering position ranges between the first angle and the second angle.

Figure 18:
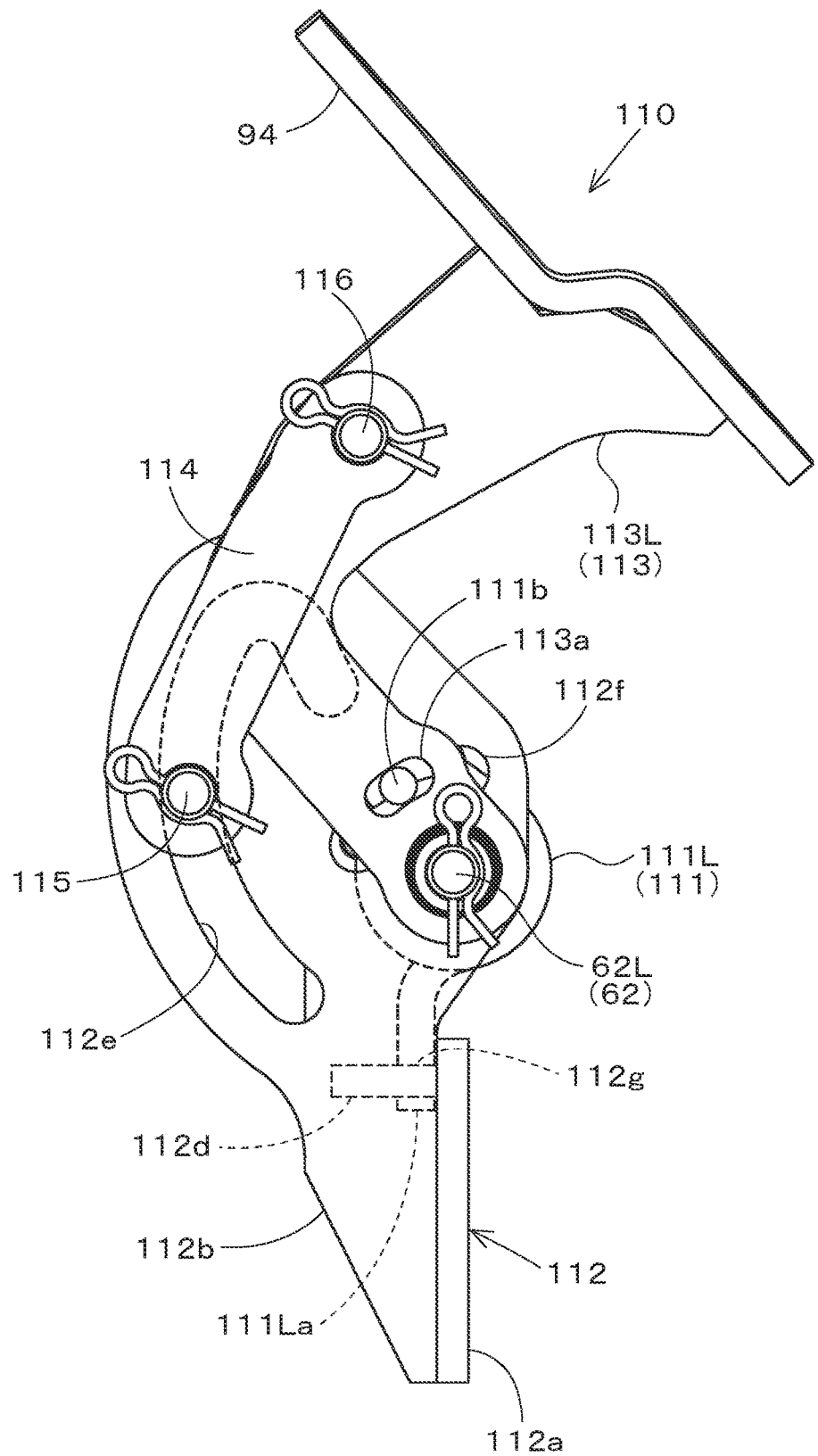
FIG. 18 is a side view of the assist mechanism when the hood is in a middle position between the uncovering position and the blocking position.

FIG. 18 illustrates the state of the assist mechanism 110 when the pivot angle at which the hood 8 pivots on the horizontal shaft 62 from the blocking position to the uncovering position ranges between the first angle and the second angle. At this time, the second end portion 111*b* of the helical torsion spring 111 is located in the intermediate portion in the long hole of the second lock 113*a*. In this state, the helical torsion spring 111 is in a natural state (is not twisted) and does not urge the spring force in first direction or in the second direction against the second member 113.

Specific examples of the action (behavior) of the assist mechanism 110 will now be described.

In the case described below, the pivot angle of the hood 8 on the horizontal shaft 62 when the hood 8 is in the blocking position is 0°, and the pivot angle on the horizontal shaft 62 when the hood 8 is in the uncovering position is 90°, the first angle is 35°, and the second angle is 55°.

In this case, the assist mechanism 110 assists in pivoting in the first direction when the pivot angle of the hood 8 on the horizontal shaft 62 ranges from the blocking position to the first angle (0° to 35°), does not assist when the pivot angle ranges between the first angle and the second angle (35° to 55°) and assists in pivoting in the second direction when the pivot angle ranges from the second angle to the uncovering position (55° to 90°).

The pivot angle on the horizontal shaft 62 when the hood 8 is in the uncovering position is not limited to 90° but may be an angle of more than 90° or may be an angle of less than 90°. The values of the first angle and the second angle are not limited to the specific values described above but can be set to appropriate values in the range of 0° to 90°. The value of the second angle is set to a value equal to or more than the value of the first angle (the second angle≥the first angle).

The value of the second angle is preferably set to a value of more than the value of the first angle (the second angle>the first angle). Consequently, in a state (a neutral state) in which the hood 8 is in a position between the blocking position and the uncovering position, the assist mechanism 110 does not assist the hood 8 in pivoting, and accordingly, opening and closing operability of the hood 8 is improved.

However, the first angle and the second angle may be equal to each other. This eliminates the state (the neutral state) in which the assist mechanism 110 does not assist the hood 8 in pivoting, and the assist mechanism 110 always assists the hood 8 in pivoting in the first direction or the second direction regardless of the position of the hood 8.

Figure 19:
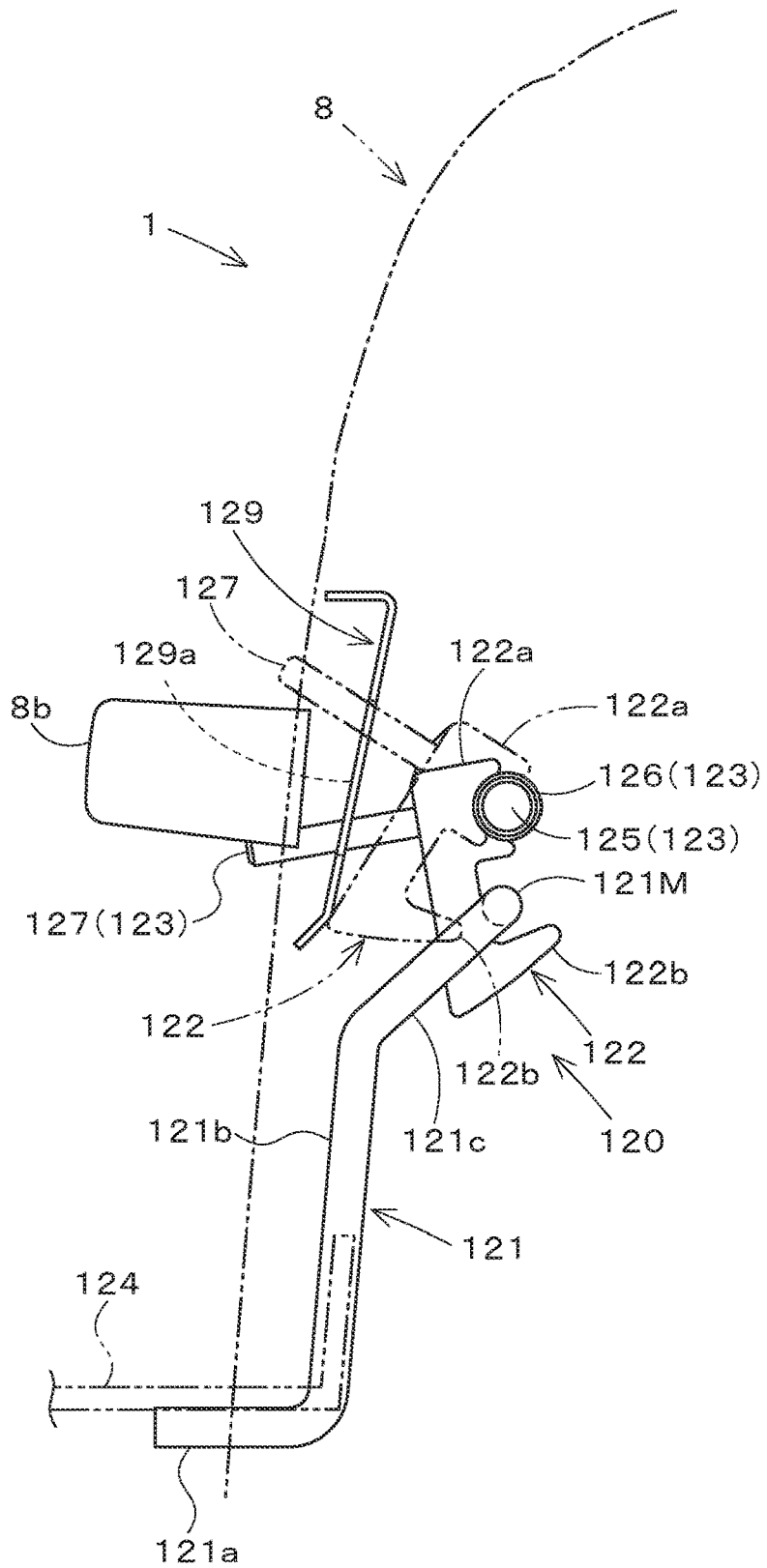
FIG. 19 is a side view of a locking mechanism.
Figure 20:
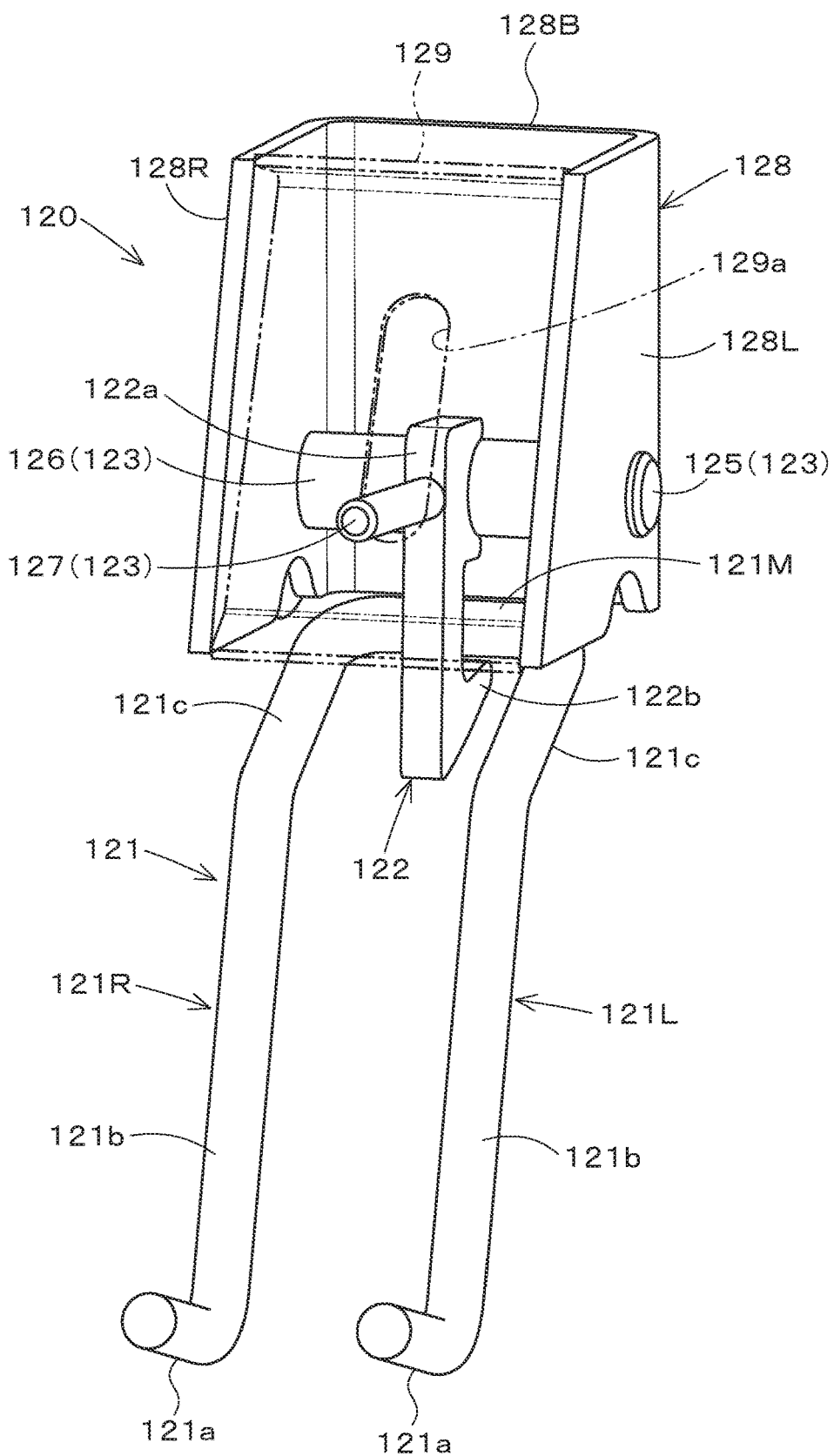
FIG. 20 is a front perspective view of the locking mechanism.

As illustrated in FIG. 11, FIG. 19, and FIG. 20, the working machine 1 includes a locking mechanism 120 that can hold the hood 8 with respect to the machine body 2 with the hood 8 closed. The locking mechanism 120 includes a receiving member 121 that is included in the machine body 2, a locking member 122 that is included in the hood 8, and an operation mechanism 123.

As illustrated in FIG. 20, the receiving member 121 includes a first portion 121L, a second portion 121R, and a coupler 121M. The first portion 121L is disposed at a position in the width direction of the machine body (on the left). The second portion 121R is disposed at another position in the width direction of the machine body (on the right). The first portion 121L and the second portion 121R include respective base end portions 121a, respective intermediate portions 121b, and respective tip portions 121c. The base end portions 121a correspond to lower portions of the receiving member 121 and extend in the forward and backward directions. The intermediate portions 121b bend at rear ends of the base end portions 121a and extend in the upward direction. The tip portions 121c obliquely extend from upper ends of the intermediate portions 121b in the upward and backward directions. The coupler 121M extends in the width direction of the machine body and couples an upper end (a first end of the first portion 121L) of the tip portion 121c of the first portion 121L and an upper end (a first end of the second portion 121R) of the tip portion 121c of the second portion 121R with each other. The locking member 122 is locked on the coupler 121M.

Figure 21:
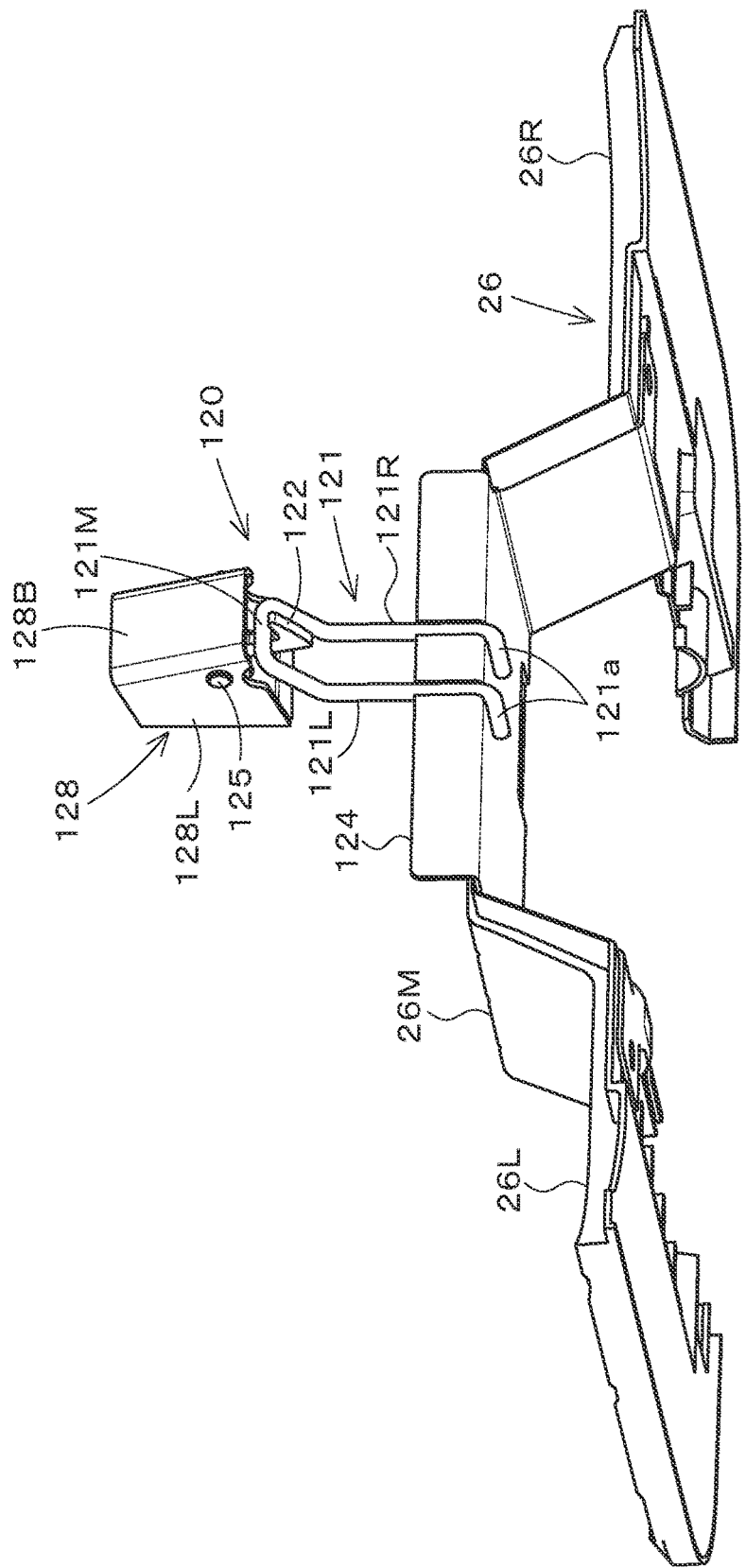
FIG. 21 is a perspective view illustrating, for example, a receiving member, a step plate, and a mounting bracket.

As illustrated in FIG. 19 and FIG. 21, the receiving member 121 is fixed to a mounting bracket 124. The mounting bracket 124 is mounted on the step plate 26. As illustrated in FIG. 11, the step plate 26 is disposed at the front portion of the machine body 2 away from the operator's seat 5 in the forward direction (away from the hood 8 in the forward direction). For this reason, the mounting bracket 124 is fixed to the step plate 26 at the front portion of the machine body 2 (away from the operator's seat 5 in the forward direction).

As illustrated in FIG. 21, the step plate 26 includes a left-hand plate portion 26L, a right-hand plate portion 26R, and a central plate portion 26M. The left-hand plate portion 26L is a portion on which the operator who sits on the operator's seat 5 puts the left-hand foot. The right-hand plate portion 26R is a portion on which the operator who sits on the operator's seat 5 puts the right-hand foot. The central plate portion 26M is higher than the left-hand plate portion 26L and the right-hand plate portion 26R and couples the left-hand plate portion 26L and the right-hand plate portion 26R with each other. The mounting bracket 124 is fixed to the central plate portion 26M.

As for the receiving member 121, a front portion of the base end portion 121a of the first portion 121L (a second end of the first portion 121L) and a front portion of the base end portion 121a of the second portion 121R (a second end of the second portion 121R) are fixed to the mounting bracket 124. Consequently, the second end of the first portion 121L and the second end of the second portion 121R are fixed to the step plate 26 of the machine body 2.

The second end of the first portion 121L and the second end of the second portion 121R are thus fixed to the machine body 2. Consequently, the receiving member 121 is held at two positions (both ends are fixed), and accordingly, the strength of the receiving member 121 can be improved. This prevents the receiving member 121 from deforming due to a load that is applied when the hood 8 is opened or closed. As for the working machine 1 according to the present embodiment, the weight of the pivot that pivots together with the hood 8 is increased because the operation device 30 is mounted on the hood 8, and accordingly, the load that is applied to the receiving member 121 when the hood 8 is opened or closed is heavy. For this reason, if the receiving member 121 is held at a single position, then there is a possibility that deformation occurs due to the load that is applied when the hood 8 is opened or closed. However, the receiving member 121 is prevented from deforming with the receiving member 121 held at the two positions.

As illustrated in FIG. 19 and FIG. 20, the locking member 122 includes a base portion 122a and a pawl portion 122b. The base portion 122a is located at a base end of the locking member 122, is fixed to the outer peripheral surface of a cylindrical body 126, and extends in a direction away from a support shaft 125. The cylindrical body 126 is fitted on the outside of the support shaft 125 that extends in the width direction of the machine body and is pivotable on the support shaft 125. The pawl portion 122b is located at the tip of the locking member 122 and bends in the forward direction.

An operation member 127 is disposed on an opposite side of the base portion 122a from the cylindrical body 126. The operation member 127 is held when the operator switches between a locking state (a state in which the hood 8 cannot be opened) and an unlocking state (a state in which the hood 8 can be opened) of the locking mechanism 120. The operation member 127 is a rod member, a first end thereof is connected to the base portion 122a, and a second end thereof faces in a direction away from the support shaft 125.

As illustrated in FIG. 20, both end portions of the support shaft 125 are supported by a support 128. In other words, the support shaft 125 is supported at two positions. The support 128 is fixed to a back surface (a rear surface) of a front portion of the hood 8. The support 128 includes a first plate 128L that supports a first end portion of the support shaft 125, a second plate 128R that supports a second end portion of the support shaft 125, and a rear plate 128B that connects a rear portion of the first plate 128L and a rear portion of the second plate 128R to each other. The first plate 128L and the second plate 128R are disposed at an interval in the width direction of the machine body so as to be parallel with each other.

A front plate 129 is mounted between a front portion of the first plate 128L and a front portion of the second plate 128R. The front plate 129 has a long hole 129a that extends in the upward and downward directions. The second end of the operation member 127 is inserted in the long hole 129a. The second end of the operation member 127 is swingable about the support shaft 125 along the long hole 129a.

The cylindrical body 126, the support shaft 125, and the operation member 127 are included in the operation mechanism 123. The operation mechanism 123 can move the locking member 122 between a locking position (a position illustrated by using solid lines in FIG. 19) in which the locking member 122 is locked on the receiving member 121 and an unlocking position (a position illustrated by using imaginary lines in FIG. 19) in which the locking member 122 is unlocked from the receiving member 121. The operation mechanism 123 can be operated by holding the operation member 127. The operation member 127 is held and pulled up in the upward direction in a state in which the locking member 122 is in the locking position (see the solid lines in FIG. 19), the locking member 122 consequently pivots on the support shaft 125 in the upward direction together with the cylindrical body 126, and the pawl portion 122b is released from the coupler 121M of the receiving member 121 (see the imaginary lines in FIG. 19). Consequently, the hood 8 that is locked is unlocked in the unlocking state. The operation member 127 is held and pushed down in the downward direction in a state in which the locking member 122 is in the unlocking position (see the imaginary lines in FIG. 19), the locking member 122 consequently pivots on the support shaft 125 in the downward direction together with the cylindrical body 126, and the pawl portion 122b is locked on the coupler 121M of the receiving member 121 (see the solid lines in FIG. 19). Consequently, the hood 8 is locked in the locking state.

As illustrated in FIG. 11 and FIG. 19, a handle 8b is disposed at the front portion of the hood 8, and the operator can hold the handle 8b and open or close the hood 8.

Seat Bracket, Operation Bracket, and Seat Belt Support

As illustrated in FIG. 1, the working machine 1 includes a seat bracket 130 that supports the operator's seat 5 on the machine body 2 (specifically, on the hood 8). The seat bracket 130 is disposed above the hood 8 and below the operator's seat 5.

As illustrated in FIG. 1, FIG. 6, FIG. 22, and FIG. 23, the seat bracket 130 includes a lower plate 130a that is placed on the hood 8 and slide rails 132L and 132R that enable the operator's seat 5 to slide in the forward and backward directions. The lower plate 130a is fixed to the upper surface of the hood 8 by using, for example, at least one bolt 131. The slide rails 132L and 132R are fixed to an upper surface of the lower plate 130a.

Figure 22:
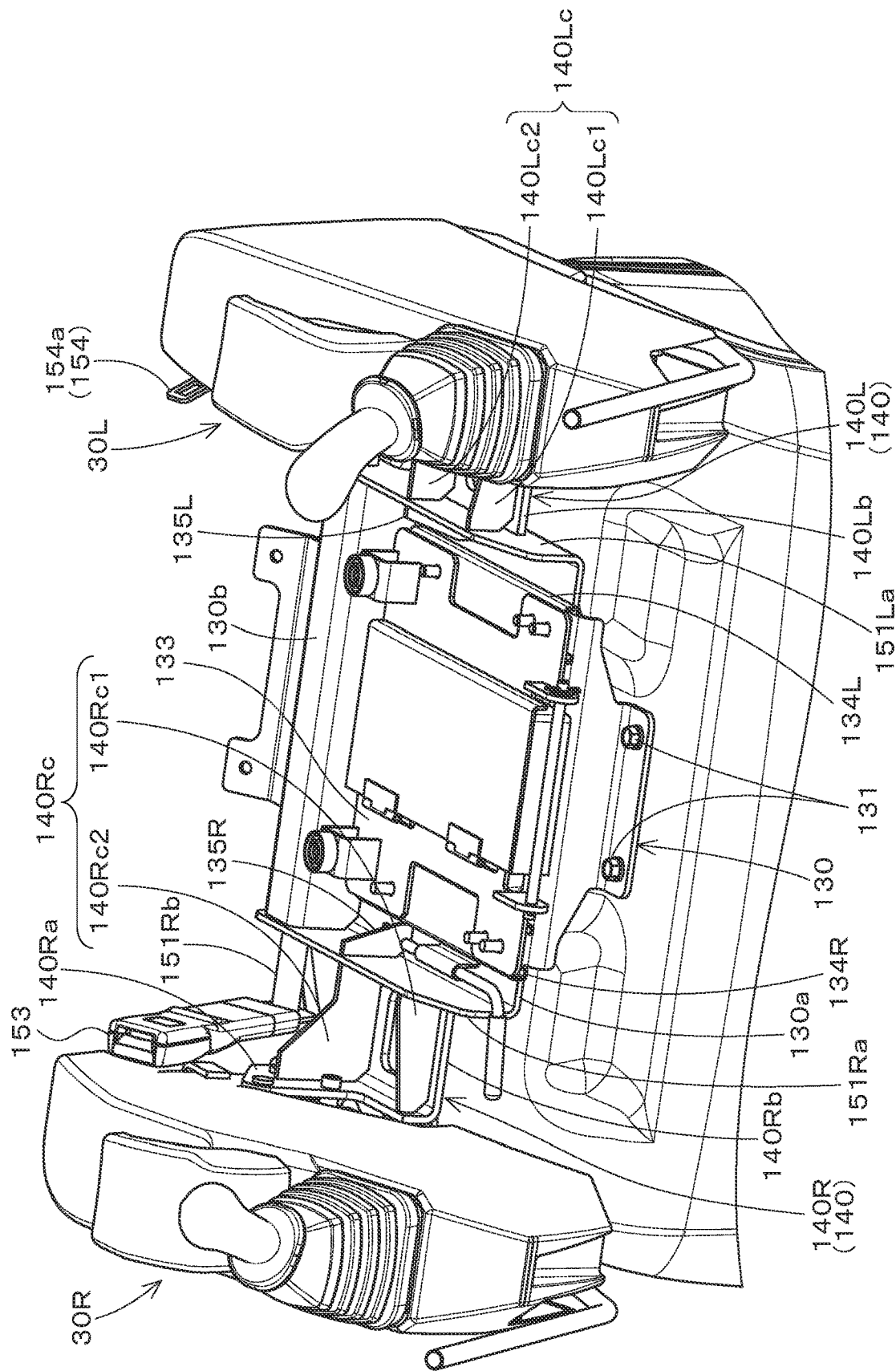
FIG. 22 is a front perspective view illustrating, for example, the seat bracket, the seat belt support, and the operation bracket.
Figure 23:
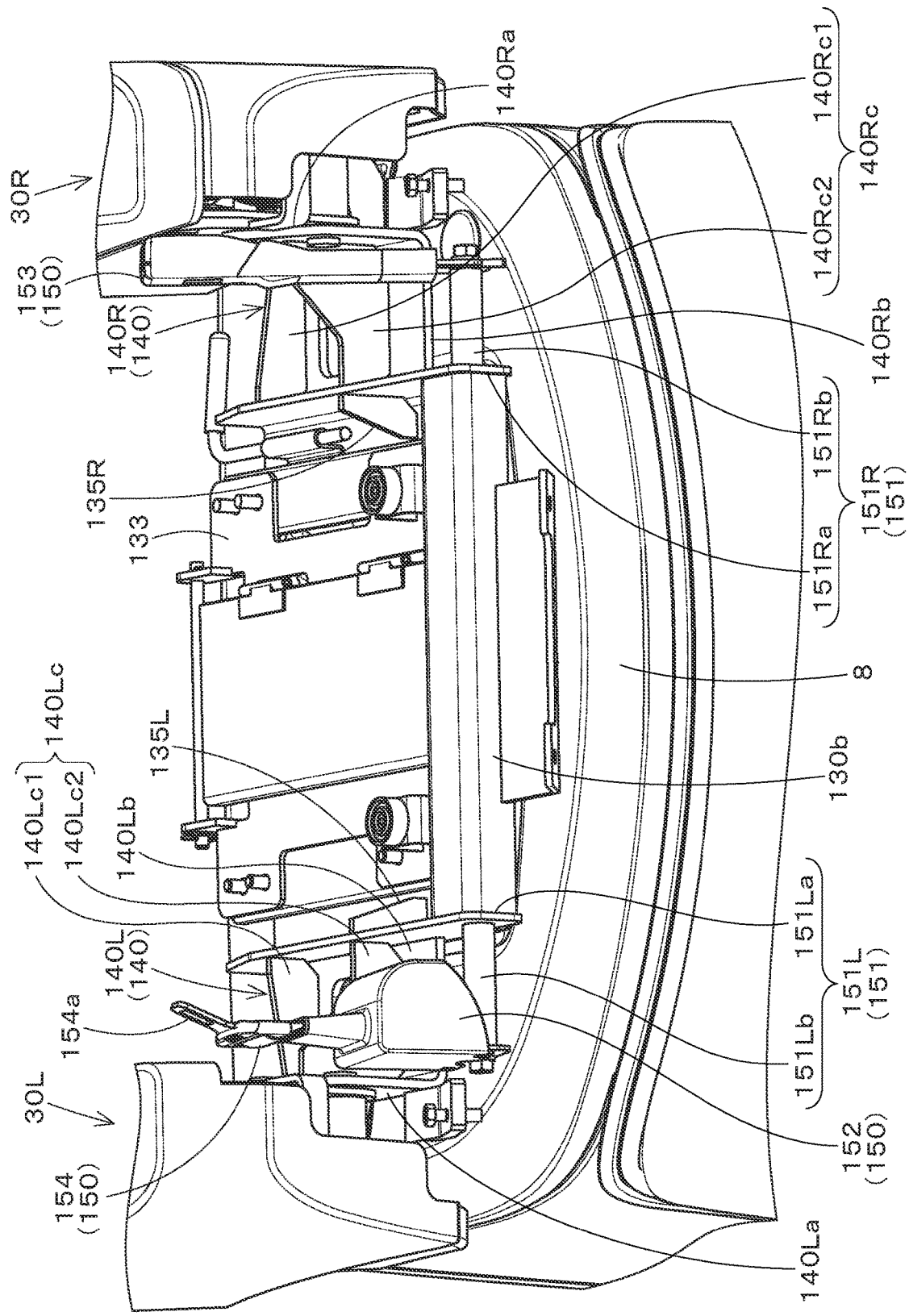
FIG. 23 is a rear perspective view illustrating, for example, the seat bracket, the seat belt support, and the operation bracket.

The slide rail 132L and the slide rail 132R are disposed at an interval in the width direction of the machine body and extend in the forward and backward directions so as to be parallel with each other. As illustrated in FIG. 22 and FIG. 23, a support plate 133 that supports a lower portion of the operator's seat 5 is disposed above the lower plate 130a. As illustrated in FIG. 1 and FIG. 22, rail members 134L and 134R are fixed to a lower surface of the support plate 133. The rail member 134L and the rail member 134R are disposed at an interval in the width direction of the machine body and extend in the forward and backward directions so as to be parallel with each other. The rail member 134L is placed on the slide rail 132L and is slidable in the forward and backward directions along the slide rail 132L. The rail member 134R is placed on the slide rail 132R and is slidable in the forward and backward directions along the slide rail 132R. The rail members 134L and 134R that are fixed to the support plate 133 slide in the forward and backward directions along the slide rails 132L and 132R, and the operator's seat 5 that is supported on the support plate 133 consequently moves in the forward and backward directions.

As illustrated in, for example, FIG. 1, FIG. 6, FIG. 22, and FIG. 23, the working machine 1 includes a seat belt device 150. The seat belt device 150 includes a seat belt 154 that is worn by the operator who sits on the operator's seat 5, a container 152 that contains the seat belt 154, and an engagement portion 153 (omitted in FIG. 6) with which a distal portion 154a of the seat belt 154 is engaged.

The container 152 contains the seat belt 154 such that the seat belt 154 can be pulled. As for the seat belt 154, the tip portion 154a protrudes from the container 152, and a base end portion is contained in the container 152. The tip portion 154a of the seat belt 154 that is pulled from the container 152 is engaged with the engagement portion 153.

The seat belt device 150 is supported on the machine body 2 by using a seat belt support 151. The seat belt support 151 includes a first support 151L and a second support 151R. The first support 151L is disposed on the left of the operator's seat 5. The second support 151R is disposed on the right of the operator's seat 5.

The first support 151L includes a first side plate 151La and a first support tube 151Lb. The first side plate 151La stands from a first side edge (a left-hand edge) of the lower plate 130a and extends in the upward direction. The first support tube 151Lb is connected to a surface (a left-hand surface) of the first side plate 151La facing in the outward direction with respect to the machine body and protrudes in the outward direction with respect to the machine body (the leftward direction) from the surface. The first support tube 151Lb has a cylindrical shape. The container 152 is mounted on the first support tube 151Lb. The container 152 is mounted so as to be pivotable about an axis in the width direction of the machine body with respect to the first support tube 151Lb.

The second support 151R includes a second side plate 151Ra and a second support tube 151Rb. The second side plate 151Ra stands from a second side edge (a right-hand edge) of the lower plate 130a and extends in the upward direction. The second support tube 151Rb is connected to a surface (a right-hand surface) of the second side plate 151Ra facing in the outward direction with respect to the machine body and protrudes in the outward direction with respect to the machine body (the rightward direction) from the surface. The second support tube 151Rb has a cylindrical shape. The engagement portion 153 is mounted on the second support tube 151Rb. The engagement portion 153 is mounted so as to be pivotable about the axis in the width direction of the machine body with respect to the second support tube 151Rb.

The operator who sits on the operator's seat 5 can wear the seat belt by pulling the seat belt that is contained in the container 152 and by engaging the tip portion of the seat belt with the engagement portion 153.

The first side plate 151La and the second side plate 151Ra of the seat belt support 151 and the lower plate 130a of the seat bracket 130 are integrally formed. Specifically, as for the first side plate 151La, the lower plate 130a, the first side plate 151La, and the second side plate 151Ra are acquired by folding a single plate. Consequently, the seat belt support 151 and the seat bracket 130 are integrally formed.

A reinforcement material 130b is fixed to the upper surface of the lower plate 130a. The reinforcement material 130b connects the first side plate 151La and the second side plate 151Ra to each other. Accordingly, the lower plate 130a of the seat bracket 130 and the first side plate 151La and the second side plate 151Ra of the seat belt support 151 are integrally formed by using the reinforcement material 130b. This enables the rigidity of the seat bracket 130 and the seat belt support 151 to be improved.

As illustrated in FIG. 1, FIG. 6, and FIG. 22, the first side plate 151La of the seat belt support 151 and the lower plate 130a of the seat bracket 130 are connected to each other by using a first reinforcement plate 135L. The second side plate 151Ra of the seat belt support 151 and the lower plate 130a of the seat bracket 130 are connected to each other by using a second reinforcement plate 135R. The first side plate 151La and the second side plate 151Ra are reinforced from positions in the inward direction with respect to the machine body by using the first reinforcement plate 135L and the second reinforcement plate 135R and are connected to the lower plate 130a, and accordingly, the rigidity of the seat bracket 130 and the seat belt support 151 can be improved.

As illustrated in FIG. 1, FIG. 22, and FIG. 23, the operation bracket 140 includes a first operation bracket 140L that supports the first operation device 30L and a second operation bracket 140R that supports the second operation device 30R.

As illustrated in, for example, FIG. 6 and FIG. 23, the first operation bracket 140L includes a first vertical plate 140La, a first horizontal plate 140Lb, and a first connection plate 140Lc. The first vertical plate 140La faces the first side plate 151La of the seat belt support 151. As for the first horizontal plate 140Lb, a lower portion of the first vertical plate 140La and the first horizontal plate 140Lb are connected to each other. The first vertical plate 140La and the first horizontal plate 140Lb are formed by folding a single plate into an L-shape. The first connection plate 140Lc connects the first side plate 151La, the first vertical plate 140La, and the first horizontal plate 140Lb to each other. The first connection plate 140Lc includes a first front connection plate 140Lc1 and a first rear connection plate 140Lc2. The first front connection plate 140Lc1 and the first rear connection plate 140Lc2 are disposed at an interval in the forward and backward directions so as to be parallel with each other.

As illustrated in, for example, FIG. 22 and FIG. 23, the second operation bracket 140R includes a second vertical plate 140Ra, a second horizontal plate 140Rb, and a second connection plate 140Rc. The second vertical plate 140Ra faces the second side plate 151Ra of the seat belt support 151. As for the second horizontal plate 140Rb, a lower portion of the second vertical plate 140Ra and the second horizontal plate 140Rb are connected to each other. The second vertical plate 140Ra and the second horizontal plate 140Rb are formed by folding a single plate into an L-shape. The second connection plate 140Rc connects the second side plate 151Ra, the second vertical plate 140Ra, and the second horizontal plate 140Rb to each other. The second connection plate 140Rc includes a second front connection plate 140Rc1 and a second rear connection plate 140Rc2. The second front connection plate 140Rc1 and the second rear connection plate 140Rc2 are disposed at an interval in the forward and backward directions so as to be parallel with each other.

The first connection plate 140Lc (the first front connection plate 140Lc1 and the first rear connection plate 140Lc2) connects the first side plate 151La, the first vertical plate 140La, and the first horizontal plate 140Lb to each other, and the second connection plate 140Rc (the second front connection plate 140Rc1 and the second rear connection plate 140Rc2) connects the second side plate 151Ra, the second vertical plate 140Ra, and the second horizontal plate 140Rb to each other as described above.

Consequently, the operation bracket 140 and the seat bracket 130 are firmly integrally formed, and the rigidity of the operation bracket 140 can be improved. The first side plate 151La and the second side plate 151Ra of the seat belt support 151 are reinforced from positions in the outward direction with respect to the machine body by using the first connection plate 140Lc and the second connection plate 140Rc, and the rigidity of the seat belt support 151 is improved.

The first reinforcement plate 135L overlaps the slide rail 132L and the first connection plate 140Lc (the first rear connection plate 140Lc2) in the forward and backward directions. The second reinforcement plate 135R overlaps the slide rail 132R and the second connection plate 140Rc (the second rear connection plate 140Rc2) in the forward and backward directions. This enables the first reinforcement plate 135L and the second reinforcement plate 135R to exert an improved reinforcement effect and enables the first connection plate 140Lc and the second connection plate 140Rc to exert an improved reinforcement effect.

The first horizontal plate 140Lb and the first connection plate 140Lc are connected to the first side plate 151La, and the first operation bracket 140L is consequently connected to a left-hand portion of the seat belt support 151 (the first support 151L). The second horizontal plate 140Rb and the second connection plate 140Rc are connected to the second side plate 151Ra, and the second operation bracket 140R is consequently connected to a right-hand portion of the seat belt support 151 (the second support 151R). Consequently, the operation bracket 140 and the seat belt support 151 are integrally formed.

The seat belt support 151 and the seat bracket 130 are integrally formed, and the operation bracket 140 and the seat belt support 151 are integrally formed as described above. That is, the seat belt support 151, the operation bracket 140, and the seat bracket 130 are integrally formed.

This improves the rigidity of the operation bracket 140 that is integrally formed with the seat belt support 151 and the seat bracket 130 and accordingly prevents the operation device 30 from being unsteady when the operation levers (the first operation lever 31L and the second operation lever 31R) are operated.

The seat belt support 151, the operation bracket 140, and the seat bracket 130 are integrally formed, and the number of components can be consequently decreased unlike the case where these are separated components.

Working machines 1 according to the embodiments described above achieve the following effects.

A working machine 1 includes: a machine body 2; an operator's seat 5 mounted on the machine body 2; an operation device 30 that is disposed beside the operator's seat 5 and that is configured to pivot on a pivot shaft 33 that extends in a width direction of the machine body; and a working device 4 to be operated using the operation device 30, wherein the operation device 30 includes an operation lever 31L, 31R (first operation lever 31L, second operation lever 31R) and a control valve 32L, 32R (first pilot valve 32L, second pilot valve 32R) to be operated using the operation lever 31L, 31R and connected to hydraulic hoses 35L, 35R (first pilot hoses 35L, second pilot hoses 35R), the control valve 32L, 32R includes a valve member 36 to be actuated by operating the operation lever 31L, 31R, and a block 37 that contains fluid passages 38 through which a fluid selectively flows upon actuation of the valve member 36, the fluid passages 38 bend such that first ports 37f in an upper surface 37a of the block 37 facing the valve member 36 and second ports 37g in a peripheral surface that extend from a periphery of the upper surface 37a in a direction intersecting the upper surface 37a are in communication with each other, and the hydraulic hoses 35L, 35R are connected to the second ports 37g and extend in a direction away from the peripheral surface.

With the configuration, the hydraulic hoses (the first pilot hoses 35L and/or the second pilot hoses 35R) that are connected to the control valves 32L and 32R can be guided without sharp bends. Specifically, since the multiple hydraulic hoses 35L and 35R are connected to the second ports 37g in the peripheral surfaces of the blocks 37 of the control valves 32L and 32R and extend in directions away from the peripheral surfaces, the hydraulic hoses 35L and 35R do not need to be bent from the downward direction to another direction (e.g., rearward (backward) direction) sharply at positions below the control valves 32L and 32R unlike existing techniques. This makes it possible to reduce the load on the hydraulic hoses, and improve the easiness of the assembly of the hydraulic hoses.

The peripheral surface may include a rear surface 37d having the second ports 37g, the rear surface 37d facing rearward with respect to the machine body. The hydraulic hoses 35L, 35R may extend from the second ports 37g rearward with respect to the machine body.

With the configuration, the hydraulic hoses 35L and 35R do not need to be bent from the downward direction to the backward direction sharply at positions below the control valves 32L and 32R. This makes it possible to reduce the load on the hydraulic hoses can be reduced, and improve the easiness of the assembly of the hydraulic hoses.

The block 37 may be disposed on an extension line of an axis (swing center axis 31La) of the operation lever 31L,31R that passes through a portion in which the operation lever 31L,31R is connected to the valve member 36 and below the valve member 36.

With the configuration, the blocks 37 can be placed near the operation levers 31L and 31R, and accordingly, the control valves 32L and 32R including the blocks 37 can be configured in a compact manner. This achieves a large space for enabling the hydraulic hoses 35L and 35R to be bent, and eliminates or reduces the likelihood that the hydraulic hoses 35L and 35R will be guided with sharply bends.

The operation lever 31L, 31R may be disposed at a front portion of the operation device 30. The pivot shaft 33 may be disposed at a rear portion of the operation device 30. The hydraulic hoses 35L, 35R may include a curved portion 59 that bends downward. The curved portion 59 may be disposed higher than the pivot shaft 33.

With the configuration, a large space for enabling the hydraulic hoses 35L and 35R to be bent can be achieved, and accordingly, the curved portions 59 can be bent gently.

The curved portion 59 may be disposed at a position rearward of the block 37 and forward of the pivot shaft 33.

This makes it possible to reduce the lengths of the hydraulic hoses 35L and 35R from the blocks 37 to the curved portions 59.

The working machine 1 may further include: a prime mover 10; and a hood 8 to cover the prime mover 10 from above. The operator's seat 5 and the operation device 30 may be disposed above the hood 8. The hood may have, in an upper portion thereof, an opening 80 through which the hydraulic hoses 35L, 35R pass. The opening may be located at a position rearward of the block 37 and forward of the pivot shaft 33.

With the configuration, the opening 80 of the hood 8 is located near the curved portions 59 of the hydraulic hoses 35L and 35R, and accordingly, the hydraulic hoses 35L and 35R can be substantially linearly guided at short distances from the curved portions 59 to the opening 80 of the hood 8.

The operation device 30 may include a bracket (first bracket 41L, second bracket 41R) supported by the pivot shaft 33 such that the bracket is pivotable. The bracket 41L, 41R may include a front portion 41a to support the block 37, a rear portion 41b supported by the pivot shaft 33, and a connection portion 41c to connect the front portion 41a and the rear portion 41b. The hydraulic hoses 35L, 35R may extend from the front portion 41a toward the rear portion 41b along the connection portion 41c.

With the configuration, the hydraulic hoses 35L and 35R can be arranged along the brackets 41L and 41R, and accordingly, the hydraulic hoses 35L and 35R can be easily guided to extend in the backward direction.

A working machine 1 includes: a prime mover 10 mounted on a machine body 2; a hood 8 to cover the prime mover 10 from above, to open a space above the prime mover 10 by pivoting on a horizontal shaft 62 in a first direction, and to close the space above the prime mover 10 by pivoting on the horizontal shaft 62 in a second direction; and an assist mechanism 110 to apply a spring force to assist the hood 8 in pivoting on the horizontal shaft 62. The assist mechanism 110 is operable to apply the spring force to assist the hood 8 in pivoting in the first direction when the hood 8 is opened and apply the spring force to assist the hood 8 in pivoting in the second direction when the hood 8 is closed.

With the configuration, the spring force applied by the assist mechanism 110 is added to achieve a required force when the hood 8 is opened and when the hood 8 is closed. With this, the hood 8 can be readily opened and closed with a small force.

The horizontal shaft 62 may include a first horizontal shaft 62L located at one of opposite sides of the machine body in a width direction of the machine body and a second horizontal shaft 62R located at the other of opposite sides of the machine body in the width direction of the machine body. The assist mechanism 110 may include a first spring 111L including a helical torsion spring 111 that is wound around the first horizontal shaft 62L and that applies the spring force and a second spring 111R including another helical torsion spring 111 that is wound around the second horizontal shaft 62R and that applies the spring force.

With the configuration, the helical torsion spring 111 and the horizontal shaft 62 are separately located at the opposite sides of the machine body in the width direction of the machine body, and accordingly, the hood 8 can be assisted in opening and closing in a well-balanced manner at the opposite sides of the machine body in the width direction of the machine body. In addition, a space occupied by the assist mechanism 110 in the hood 8 can be reduced, and accordingly, the space in the hood 8 can be effectively used.

The assist mechanism 110 may be operable to assist the hood 8 in pivoting in the first direction when a center of gravity of a pivot portion that pivots together with the hood 8 is located forward of a rear end 2a of the machine body 2 and assist the hood 8 in pivoting in the second direction when the center of gravity of the pivot portion is located rearward of the rear end of the machine body 2.

With the configuration, the direction of the force that is added by the assist mechanism 110 changes depending on the position of the center of gravity of the pivot portion that pivots together with the hood 8, and accordingly, the hood 8 can be smoothly opened and closed.

The assist mechanism 110 may be operable to assist the hood 8 in pivoting in the first direction when a pivot angle that is an angle of pivot of the hood 8 which pivots on the horizontal shaft 62 from a closing position to an opening position is within a range from the closing position to a first angle, and assist the hood 8 in pivoting in the second direction when the pivot angle is in a range from a second angle to the opening position, the second angle being equal to or greater than the first angle.

With the configuration, the assist mechanism 110 assists the hood 8 in pivoting in the first direction at the beginning of the operation for opening the hood 8 (the range from the closing position to the first angle), and accordingly, the hood 8 can be readily opened. In addition, the assist mechanism 110 assists the hood 8 in pivoting in the second direction at the beginning of the operation of closing the hood 8 (the range from the opening position to the second angle), and accordingly, the hood 8 can be readily closed.

The assist mechanism 110 may be operable to not assist the hood 8 in pivoting when the pivot angle is between the first angle and the second angle.

With the configuration, the force for assisting the hood 8 in pivoting is not applied when the hood 8 is in an intermediate position (the range between the first angle and the second angle) between the opening position and the closing position. Accordingly, while the hood 8 is opened or closed, it is possible to eliminate or reduce the likelihood that a force to counter the opening or closing movement will be applied, and the hood 8 can be smoothly opened or closed.

The assist mechanism 110 may include a first member 112 fixed to the machine body 2, a second member 113 fixed to the hood 8 and pivotable on the horizontal shaft 62 relative to the first member 112, and a linkage member 114 having one of opposite ends mounted on the first member 112 via a first shaft 115 and the other of the opposite ends mounted on the second member 113 via a second shaft 116. The first member 112 may include a first lock 112g to lock one or opposite end portions of the helical torsion spring 111 and has a guide hole 112e to guide movement of the first shaft 115 with pivot movement of the hood 8. The second member 113 may include a second lock 113a to lock the other of the opposite end portions of the helical torsion spring 111.

With the configuration, the spring force of the helical torsion spring 111 can be smoothly transmitted to the hood 8 reliably because the first member 112, the second member 113, and the linkage member 114 operate together.

The second lock 113a may have a long hole in the form of an arc centered on the horizontal shaft 62. The other of the opposite end portions of the helical torsion spring 111 may be in contact with one of opposite ends of the long hole when the hood 8 is closed and in contact with the other of the opposite ends of the long hole when the hood 8 is open.

With the configuration, when the hood 8 is closed, the other of the opposite end portions of the helical torsion spring 111 is in contact with the one of the opposite ends of the long hole of the second lock 113a, and therefore the force in the first direction can be applied to the second member 113. When the hood 8 is opened, the other of the opposite end portions of the helical torsion spring 111 is in contact with the other of the opposite ends of the long hole of the second lock 113a, and therefore the force in the second direction can be applied to the second member 113.

The working machine 1 may further include: a locking mechanism 120 to hold the hood 8 in a closed state with respect to the machine body 2. The locking mechanism 120 may include a receiving member 121 on the machine body 2, a locking member 122 on the hood 8 to be locked on the receiving member 121, and an operation mechanism 123 to move the locking member 122 between a locking position in which the locking member 122 is locked on the receiving member 121 and an unlocking position in which the locking member 122 is unlocked from the receiving member 121. The receiving member 121 may include a first portion 121L located at one of opposite sides of the machine body in a width direction, a second portion 121R disposed at the other of the opposite sides of the machine body in the width direction, and a coupler 121M on which the locking member 122 is locked, the coupler 121M coupling one of opposite ends of the first portion 121L and one of opposite ends of the second portion 121R with each other. The other of the opposite ends of the first portion 121L and the other of the opposite ends of the second portion 121R may be fixed to the machine body 2.

With the configuration, the other of the opposite ends of the first portion 121L and the other of the opposite ends of the second portion 121R are fixed to the machine body 2, and therefore the receiving member 121 is held at the two positions (both ends are fixed). Accordingly, the strength of the receiving member 121 can be improved. This eliminates or reduces the likelihood that the receiving member 121 will deform due to the load applied when the hood 8 is opened or closed.

A working machine 1 includes: a machine body 2; a hydraulic fluid tank 9 mounted on the machine body 2; a working device 4 to be driven by a hydraulic fluid stored in the hydraulic fluid tank 9; and a hydraulic hose 35L, 35R through which the hydraulic fluid flows, wherein the hydraulic fluid tank 9 includes a viewing window 90 through which the hydraulic fluid in the hydraulic fluid tank 9 is visible, and a tubular portion 91 having the viewing window 90 attached thereto and having an outer surface 91a that protrudes from a wall surface of the hydraulic fluid tank 9 and that guides the hydraulic hose 35L, 35R.

With the configuration, the hydraulic hoses 35L and 35R can be guided by the tubular portion 91 that includes the viewing window 90 through which the inner space of the hydraulic fluid tank 9 is visible, and accordingly, the fluid (the fluid surface) that is stored in the hydraulic fluid tank 9 can be well viewed from the outside without being hindered by the hydraulic hoses 35L and 35R and the hydraulic hoses 35L and 35R are appropriately guided in required directions. The outer surface 91a of the tubular portion 91 functions as a hose guide for guiding the hydraulic hoses 35L and 35R, and accordingly, the number of the hose guides can be reduced to reduce the number of components.

The length of the protrusion of the tubular portion 91 from the hydraulic fluid tank 9 may be set to a length equal to or more than the outer diameters of the hydraulic hoses 35L and 35R.

With the configuration, the hydraulic hoses 35L and 35R are brought into contact with the tubular portion 91 with certainty and can be smoothly guided.

The working machine 1 may include the operator's seat 5 that is mounted on the machine body 2, and the operation device 30 that operates the working device 4. The operation device 30 may include the first operation device 30L that is adjacent to a side of the operator's seat 5 and the second operation device 30R that is adjacent to another side of the operator's seat 5. The hydraulic hoses 35L and 35R may include the first hydraulic hoses 35L that are connected to the first operation device 30L, and the second hydraulic hoses 35R that are connected to the second operation device 30R. The first hydraulic hoses 35L and the second hydraulic hoses 35R may be guided along the outer surface of the tubular portion 91 opposite each other with the viewing window 90 interposed therebetween.

With the configuration, the first hydraulic hoses 35L and the second hydraulic hoses 35R can be guided so as to be separated with the tubular portion 91 interposed therebetween, and accordingly, the first hydraulic hoses 35L and the second hydraulic hoses 35R can be prevented from interfering with each other or entangled with each other.

The tubular portion 91 may have a cylindrical shape.

With the configuration, the hydraulic hoses 35L and 35R can extend along the curve of the outer surface (the outer peripheral surface) 91a of the tubular portion 91, and accordingly, the hydraulic hoses 35L and 35R can be smoothly guided without being damaged.

The tubular portion 91 may have a cylindrical shape having an axial center that extends in a substantially horizontal direction. The hydraulic hoses 35L and 35R may extend in the upward and downward directions along the outer surface of the tubular portion 91.

With the configuration, the hydraulic hoses 35L and 35R can be smoothly guided in the upward and downward directions along the outer surface of the tubular portion 91.

The first guide member 101 that guides the hydraulic hoses 35L and 35R toward the tubular portion 91 may be mounted on the hydraulic fluid tank 9.

With the configuration, the hydraulic hoses 35L and 35R can be smoothly guided toward the tubular portion 91 by using the first guide member 101. In addition, the first guide member 101 is mounted on the hydraulic fluid tank 9, this eliminates the necessity to prepare another member (such as a bracket) for mounting the first guide member 101, and the number of components can be decreased.

The first guide member 101 may be composed of a round rod that is mounted along the corner edge of the hydraulic fluid tank 9.

With the configuration, the hydraulic hoses 35L and 35R are prevented from being damaged by being brought into contact with the corner edge of the hydraulic fluid tank 9, and the hydraulic hoses 35L and 35R can be smoothly guided toward the tubular portion 91 by using the first guide member 101.

The machine body 2 may include the turn plate 6 that can turn about an axis that extends in upward and downward directions. The second guide member 102 that guides the hydraulic hoses 35L and 35R that extend along the tubular portion 91 may be mounted on the turn plate 6.

With the configuration, the hydraulic hoses 35L and 35R that extend along the tubular portion 91 can be smoothly guided by using the second guide member 102. In addition, the second guide member 102 is mounted on the turn plate 6 that is rigid, and the rigidity of the second guide member 102 is consequently increased to prevent deformation.

The working machine 1 may include the valve unit 21 that controls supply of the hydraulic fluid to the working device 4, and the operation device 30 that operates the working device 4. The operation device 30 may include the pilot valves (the first pilot valve 32L and the second pilot valve 32R) that control supply of the pilot oil for actuating the valve unit 21. The hydraulic hoses 35L and 35R may be pilot hoses that connect the operation device 30 and the valve unit 21 to each other and that cause the pilot oil to flow.

With the configuration, the fluid that is stored in the hydraulic fluid tank 9 can be successfully viewed from the outside without obstruction of the pilot hoses 35L and 35R.

The viewing window 90 may enable the hydraulic fluid in the hydraulic fluid tank 9 to be visible through the inner space of the tubular portion 91.

With the configuration, the hydraulic fluid can be viewed through the viewing window 90 without obstruction of the hydraulic hoses 35L and 35R with the hydraulic hoses 35L and 35R guided by the outer surface 91a of the tubular portion 91.

The working machine 1 may include the machine body 2, the operator's seat 5 that is mounted on the machine body 2, the operation device 30 that is disposed on the machine body 2 beside the operator's seat 5, the working device 4 to be operated by the operation device 30, the seat belt device 150 including the seat belt 154 that is worn by the operator who sits on the operator's seat 5, the container 152 that contains the seat belt 154, and the engagement portion 153 with which the tip portion 154a of the seat belt 154 that is pulled from the container 152 is engaged, the operation bracket 140 to support the operation device 30 on the machine body 2, and the seat belt support 151 to support the seat belt device 150 on the machine body 2. The operation bracket 140 and the seat belt support 151 may be integrally formed.

With the configuration, the operation bracket 140 that supports the operation device 30 on the machine body 2 and the seat belt support 151 that supports the seat belt device 150 on the machine body 2 are integrally formed, the rigidity of the operation bracket 140 is consequently improved, and the operation device 30 can be prevented from being unsteady when being operated.

The working machine 1 may include the seat bracket 130 to support the operator's seat 5 on the machine body 2. The seat bracket 130, the operation bracket 140, and the seat belt support 151 may be integrally formed.

With the configuration, the seat belt support 151, the operation bracket 140, and the seat bracket 130 are integrally formed, the rigidity of the operation bracket 140 can be consequently further improved, and the number of components can be decreased unlike the case where these are separated components.

The operation device 30 may include the first operation device 30L that is adjacent to a side of the operator's seat 5 and the second operation device 30R that is adjacent to another side of the operator's seat 5. The operation bracket 140 may include the first operation bracket 140L that supports the first operation device 30L and the second operation bracket 140R that supports the second operation device 30R. The seat bracket 130 may include the lower plate 130a that is placed on the hood 8, and the slide rails 132L and 132R that are fixed to the upper surface of the lower plate 130a and that enable the operator's seat 5 to slide in forward and backward directions. The seat belt support 151 may include the first side plate 151La that stands from the first side edge of the lower plate 130a and that is connected to the first operation bracket 140L, and the second side plate 151Ra that stands from the second side edge of the lower plate 130a and that is connected to the second operation bracket 140R.

With the configuration, the first side plate 151La and the second side plate 151Ra of the seat belt support 151 stand from the lower plate 130a of the seat bracket 130, and the seat belt support 151 and the seat bracket 130 that are integrally formed can be consequently compact. In addition, the first operation bracket 140L is connected to the first side plate 151La, the second operation bracket 140R is connected to the second side plate 151Ra, and the first operation bracket 140L, the second operation bracket 140R, the seat belt support 151, and the seat bracket 130 that are integrally formed can be consequently compact.

The seat belt support 151 may include the first support 151L on which the container 152 is mounted, the first support 151L including the first side plate 151La, and the second support 151R on which the engagement portion 153 is mounted, the second support 151R including the second side plate 151Ra.

With the configuration, the first support 151L on which the container 152 is mounted, the second support 151R on which the container 152 is mounted, and the seat belt support 151 are integrally formed, and accordingly, the rigidity of the first support 151L, the second support 151R, and the seat belt support 151 can be improved.

The working machine 1 may include the reinforcement material 130b that is fixed to the upper surface of the lower plate 130a and that connects the first side plate 151La and the second side plate 151Ra to each other.

With the configuration, the lower plate 130a of the seat bracket 130 and the first side plate 151La and the second side plate 151Ra of the seat belt support 151 are integrally formed by using the reinforcement material 130b, and accordingly, the rigidity of the seat bracket 130 and the seat belt support 151 can be improved.

The first operation bracket 140L may include the first vertical plate 140La that faces the first side plate 151La, the first horizontal plate 140Lb that connects the lower portion of the first vertical plate 140La and the first side plate 151La to each other, and the first connection plate 140Lc that connects the first side plate 151La, the first vertical plate 140La, and the first horizontal plate 140Lb to each other. The second operation bracket 140R may include the second vertical plate 140Ra that faces the second side plate 151Ra, the second horizontal plate 140Rb that connects the lower portion of the second vertical plate 140Ra and the second side plate 151Ra to each other, and the second connection plate 140Rc that connects the second side plate 151Ra, the second vertical plate 140Ra, and the second horizontal plate 140Rb to each other.

With the configuration, the first connection plate 140Lc and the second connection plate 140Rc enable the rigidity of the operation bracket 140 (the first operation bracket 140L and the second operation bracket 140R) to be improved.

The working machine 1 may include the first reinforcement plate 135L that connects the first side plate 151La and the lower plate 130a to each other, and the second reinforcement plate 135R that connects the second side plate 151Ra and the lower plate 130a to each other. The first reinforcement plate 135L may overlap the slide rails 132L and 132R and the first connection plate 140Lc in the forward and backward directions. The second reinforcement plate 135R may overlap the slide rails 132L and 132R and the second connection plate 140Rc in the forward and backward directions.

With the configuration, a combination of the reinforcement effect of the slide rail 132L, the first connection plate 140Lc, the slide rail 132R, and the second connection plate 140Rc and the reinforcement effect of the first reinforcement plate 135L and the second reinforcement plate 135R further improves the rigidity of the seat bracket 130, the seat belt support 151, and the operation bracket 140.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a machine body;
an operator's seat mounted on the machine body;
an operation device that is disposed beside the operator's seat and that is configured to pivot on a pivot shaft that extends in a width direction of the machine body; and
a working device to be operated using the operation device, wherein
the operation device includes an operation lever and a control valve to be operated using the operation lever and connected to hydraulic hoses,
the control valve includes a valve member to be actuated by operating the operation lever, and a block that contains fluid passages through which a fluid selectively flows upon actuation of the valve member,
the fluid passages bend such that first ports in an upper surface of the block facing the valve member and second ports in a peripheral surface that extends from a periphery of the upper surface in a direction intersecting the upper surface are in communication with each other,
the hydraulic hoses are connected to the second ports and extend in a direction away from the peripheral surface,
the operation device includes a bracket supported by the pivot shaft such that the bracket is pivotable,
the bracket includes a front portion to support the block, a rear portion supported by the pivot shaft, and a connection portion to connect the front portion and the rear portion, and
the hydraulic hoses extend from the front portion toward the rear portion along the connection portion.

2. The working machine according to claim 1, wherein
the peripheral surface includes a rear surface having the second ports, the rear surface facing rearward with respect to the machine body, and
the hydraulic hoses extend from the second ports rearward with respect to the machine body.

3. The working machine according to claim 1, wherein
the block is disposed on an extension line of an axis of the operation lever that passes through a portion in which the operation lever is connected to the valve member and below the valve member.

4. The working machine according to claim 1, wherein
the operation lever is disposed at a front portion of the operation device,
the pivot shaft is disposed at a rear portion of the operation device,
the hydraulic hoses include a curved portion that bends downward, and
the curved portion is disposed higher than the pivot shaft.

5. The working machine according to claim 4, wherein
the curved portion is disposed at a position rearward of the block and forward of the pivot shaft.

6. The working machine according to claim 5, further comprising:
a prime mover; and
a hood to cover the prime mover from above, wherein
the operator's seat and the operation device are disposed above the hood,
the hood has, in an upper portion thereof, an opening through which the hydraulic hoses pass, and
the opening is located at a position rearward of the block and forward of the pivot shaft.

7. The working machine according to claim 6, wherein
the hood is operable to open a space above the prime mover by pivoting on a horizontal shaft in a first direction and closes the space above the prime mover by pivoting on the horizontal shaft in a second direction,
the hood includes an assist mechanism to apply a spring force to assist the hood in pivoting on the horizontal shaft, and the assist mechanism is operable to apply the spring force to assist the hood in pivoting in the first direction when the hood is opened and apply the spring force to assist the hood in pivoting in the second direction when the hood is closed.

8. The working machine according to claim 7, wherein the assist mechanism is operable to assist the hood in pivoting in the first direction when a center of gravity of a pivot portion that pivots together with the hood is located forward of a rear end of the machine body and assist the hood in pivoting in the second direction when the center of gravity of the pivot portion is located rearward of the rear end of the machine body.

9. The working machine according to claim 7, wherein the assist mechanism is operable to assist the hood in pivoting in the first direction when a pivot angle that is an angle of pivot of the hood which pivots on the horizontal shaft from a closing position to an opening position is within a range from the closing position to a first angle, and assist the hood in pivoting in the second direction when the pivot angle is in a range from a second angle to the opening position, the second angle being equal to or greater than the first angle.

10. The working machine according to claim 9, wherein the assist mechanism is operable to not assist the hood in pivoting when the pivot angle is between the first angle and the second angle.

11. The working machine according to claim 7, further comprising:
a locking mechanism to hold the hood in a closed state with respect to the machine body, wherein
the locking mechanism includes
a receiving member on the machine body,
a locking member on the hood to be locked on the receiving member, and
an operation mechanism to move the locking member between a locking position in which the locking member is locked on the receiving member and an unlocking position in which the locking member is unlocked from the receiving member,
the receiving member includes a first portion located at one of opposite sides of the machine body in a width direction, a second portion disposed at the other of the opposite sides of the machine body in the width direction, and a coupler on which the locking member is locked, the coupler coupling one of opposite ends of the first portion and one of opposite ends of the second portion with each other, and
the other of the opposite ends of the first portion and the other of the opposite ends of the second portion are fixed to the machine body.

12. The working machine according to claim 1, further comprising:
a seat belt device including a seat belt to be worn by an operator who sits on the operator's seat, a container to contain the seat belt, and an engagement portion with which a distal portion of the seat belt pulled from the container is engaged;
an operation bracket to support the operation device on the machine body; and
a seat belt support to support the seat belt device on the machine body, wherein
the operation bracket and the seat belt support are integral with each other.

13. The working machine according to claim 12, further comprising:
a seat bracket to support the operator's seat on the machine body, wherein
the seat bracket, the operation bracket, and the seat belt support are integral with each other.

14. The working machine according to claim 12, wherein
the operation device includes a first operation device provided on one side of the operator's seat and a second operation device provided on the opposite side of the operator's seat,
the operation bracket includes a first operation bracket to support the first operation device and a second operation bracket to support the second operation device,
a seat bracket includes a lower plate placed on a hood, and a slide rail fixed to an upper surface of the lower plate to allow the operator's seat to slide in forward and backward directions, and
the seat belt support includes a first side plate that extends upward from a one of opposite side edges of the lower plate and that is connected to the first operation bracket, and a second side plate that extends upward from the other of the opposite side edges of the lower plate and that is connected to the second operation bracket.

15. The working machine according to claim 1, further comprising:
an oil tank mounted on the machine body; wherein
the working device is a working device to be driven by a hydraulic fluid stored in the oil tank;
the hydraulic hoses are hydraulic hoses through which the hydraulic fluid flows; and
the oil tank includes
a viewing window through which the hydraulic fluid in the oil tank is visible, and
a tubular portion having the viewing window attached thereto and having an outer surface that protrudes from a wall surface of the oil tank and that guides the hydraulic hoses.

16. A working machine comprising:
a prime mover mounted on a machine body;
a hood to cover the prime mover from above, to open a space above the prime mover by pivoting on a horizontal shaft in a first direction, and to close the space above the prime mover by pivoting on the horizontal shaft in a second direction; and
an assist mechanism to apply a spring force to assist the hood in pivoting on the horizontal shaft, wherein
the assist mechanism is operable to apply the spring force to assist the hood in pivoting in the first direction when the hood is opened and apply the spring force to assist the hood in pivoting in the second direction when the hood is closed,
the horizontal shaft includes a first horizontal shaft located at one of opposite sides of the machine body in a width direction of the machine body and a second horizontal shaft located at the other of opposite sides of the machine body in the width direction of the machine body,
the assist mechanism includes a first spring including a helical torsion spring that is wound around the first horizontal shaft and that applies the spring force and a second spring including another helical torsion spring that is wound around the second horizontal shaft and that applies the spring force,
the assist mechanism includes
a first member fixed to the machine body,
a second member fixed to the hood and pivotable on the first or second horizontal shaft relative to the first member, and a linkage member having one of opposite ends mounted on the first member via a first shaft and the other of the opposite ends mounted on the second member via a second shaft, the first member includes a first lock to lock one of opposite end portions of the helical torsion spring or the other helical torsion spring and has a guide hole to guide movement of the first shaft with pivot movement of the hood, and the second member includes a second lock to lock the other of the opposite end portions of the helical torsion spring or the other helical torsion spring.

17. The working machine according to claim 16, wherein the second lock has a long hole in the form of an arc centered on the first or second horizontal shaft, and the other of the opposite end portions of the helical torsion spring or the other helical torsion spring is in contact with one of opposite ends of the long hole when the hood is closed and is in contact with the other of the opposite ends of the long hole when the hood is open.

18. A working machine comprising:

a machine body;

an operator's seat mounted on the machine body;

an operation device that is disposed beside the operator's seat and that is configured to pivot on a pivot shaft that extends in a width direction of the machine body; and a working device to be operated using the operation device, wherein the operation device includes an operation lever and a control valve to be operated using the operation lever and connected to hydraulic hoses, the control valve includes a valve member to be actuated by operating the operation lever, and a block that contains fluid passages through which a fluid selectively flows upon actuation of the valve member, the fluid passages bend such that first ports in an upper surface of the block facing the valve member and second ports in a peripheral surface that extends from a periphery of the upper surface in a direction intersecting the upper surface are in communication with each other, the hydraulic hoses are connected to the second ports and extend in a direction away from the peripheral surface, and the block is disposed on an extension line of an axis of the operation lever that passes through a portion in which the operation lever is connected to the valve member and below the valve member, and the first ports are connected to the valve member.

* * * * *